(12) United States Patent
Mizuhashi et al.

(10) Patent No.: US 10,809,860 B2
(45) Date of Patent: *Oct. 20, 2020

(54) DISPLAY DEVICE

(71) Applicant: Japan Display Inc., Tokyo (JP)

(72) Inventors: Hiroshi Mizuhashi, Tokyo (JP);
Makoto Hayashi, Tokyo (JP);
Yasuyuki Teranishi, Tokyo (JP);
Daisuke Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,125

(22) Filed: Apr. 18, 2019

(65) Prior Publication Data

US 2019/0243490 A1 Aug. 8, 2019

Related U.S. Application Data

(63) Continuation of application No. 15/856,595, filed on Dec. 28, 2017, now Pat. No. 10,282,048, which is a
(Continued)

(30) Foreign Application Priority Data

Mar. 6, 2015 (JP) ................ 2015-044976

(51) Int. Cl.
*G06F 3/044* (2006.01)
*G09G 3/36* (2006.01)
*G06F 3/041* (2006.01)

(52) U.S. Cl.
CPC ............ *G06F 3/044* (2013.01); *G06F 3/0412* (2013.01); *G09G 3/3655* (2013.01); *G09G 3/3648* (2013.01); *G09G 2300/0426* (2013.01)

(58) Field of Classification Search
CPC ........ G06F 3/0412; G06F 3/044; G06F 3/016; G06F 3/03545; G09G 2300/0426; G09G 3/3648; G09G 3/3655
See application file for complete search history.

(56) References Cited

U.S. PATENT DOCUMENTS 9,201,541 B2 12/2015 Kida et al.
9,442,596 B2 9/2016 Kida et al.
(Continued)

FOREIGN PATENT DOCUMENTS

CN 103853409 6/2014
JP 2012230657 11/2012

OTHER PUBLICATIONS

Chinese Office Action dated May 29, 2018 in Chinese Application No. 201610125420.1.

*Primary Examiner* — Richard J Hong
(74) *Attorney, Agent, or Firm* — K&L Gates LLP

(57) ABSTRACT

A display device including: a plurality of pixels arranged in a matrix form and having a first side parallel to a row and a second side opposite to the first side; scanning lines arranged in each row of the pixels to supply a scanning signal to the pixels; signal lines arranged in each column of the pixels to supply an image signal to the pixels; a drive electrode circuit which is arranged along the first side; and a plurality of drive electrodes which are arranged in the direction of column of the pixels and to which a drive signal to detect an object is supplied from the drive electrode circuit, wherein the signal lines transmit the image signal in a display period, and at least one of the signal lines transmits a control signal to control the drive electrode circuit in a touch detection period.

7 Claims, 15 Drawing Sheets

Related U.S. Application Data continuation of application No. 15/058,767, filed on Mar. 2, 2016, now Pat. No. 9,916,054.

(56) References Cited

U.S. PATENT DOCUMENTS

| | | |
|---|---|---|
| 9,753,599 B2 | 9/2017 | Kida et al. |
| 2010/0194698 A1 | 8/2010 | Hotelling |
| 2011/0316809 A1 | 12/2011 | Kim et al. |
| 2012/0262387 A1 | 10/2012 | Hiroshi et al. |
| 2014/0028616 A1 | 1/2014 | Furutani et al. |
| 2015/0103038 A1 | 4/2015 | Han |
| 2015/0338930 A1* | 11/2015 | Hara .................. G06F 3/03545 345/158 |
| 2017/0315639 A1 | 11/2017 | Kida et al. |
| 2018/0011537 A1* | 1/2018 | Agari ..................... G06F 3/016 |

\* cited by examiner

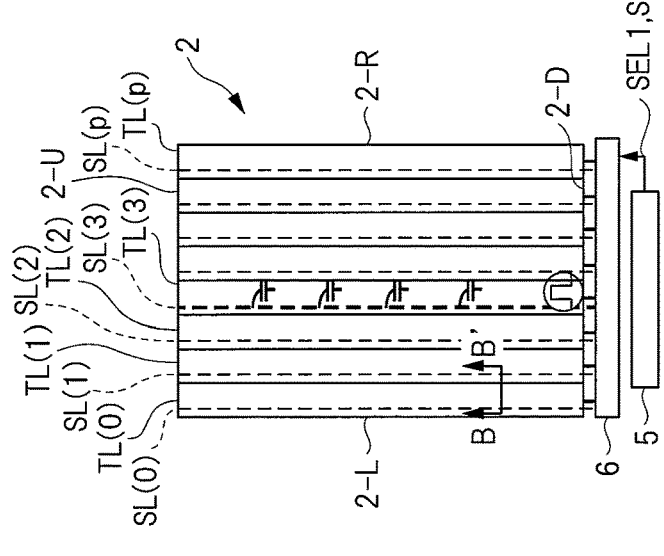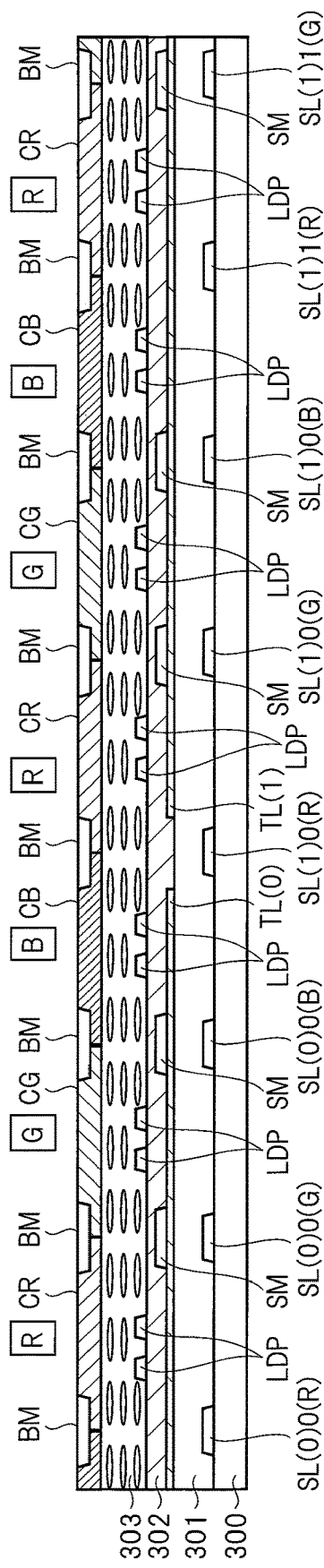
FIG. 3A
FIG. 3B

FIG. 12A SEL1
FIG. 12B VCOMSEL
FIG. 12C TSVCOM
FIG. 12D TP(0)
FIG. 12E Tx(0)

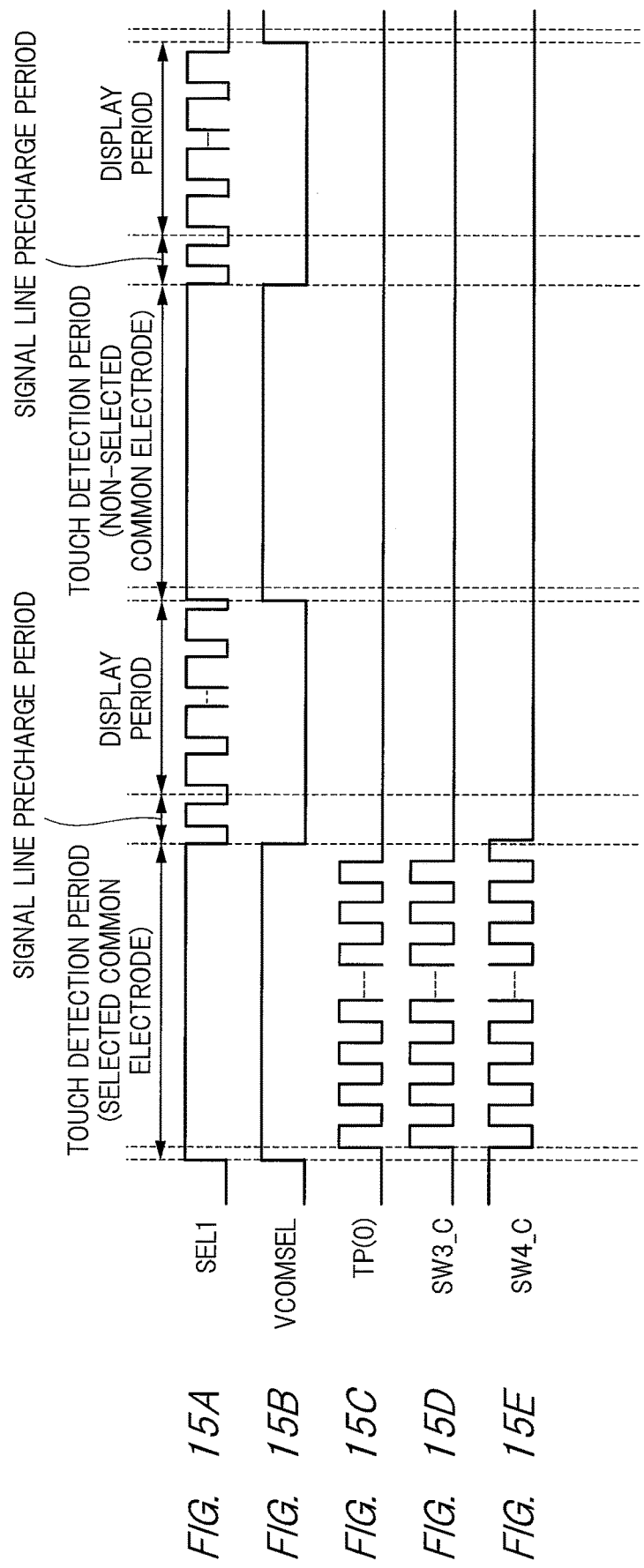

DISPLAY DEVICE

CROSS REFERENCES TO RELATED APPLICATIONS

The present application is a continuation application of U.S. patent application Ser. No. 15/856,595, filed on Dec. 28, 2017, which application is a continuation application of U.S. patent application Ser. No. 15/058,767, filed on Mar. 2, 2016, issued as U.S. Pat. No. 9,916,054 on Mar. 13, 2018, which application claims priority to Japanese Patent Application JP 2015-044976 filed in the Japan Patent Office on Mar. 6, 2015, the entire content of which is hereby incorporated by reference.

BACKGROUND

The present invention relates to a display device, and in particular, relates to a display device with a touch detection function capable of detecting an external proximity object.

In recent years, a touch detection device referred to as a touch panel capable of detecting an external proximity object has attracted attention. The touch panel is mounted on or integrated with a display device, for example, a liquid crystal display device. In a display device in which a touch panel is mounted on or integrated with a display device, that is, a display device with a touch detection function, various button images or the like are displayed on the display device, and proximity of an external object to a button image is detected through the touch panel. This enables the use of the touch panel as information input means instead of a normal mechanical button. Since such a display device with a touch detection function does not necessarily need information input means such as a keyboard or a mouse, its use tends to increase with the inclusion of mobile information terminals such as mobile phones in addition to computers.

As a detection method of a touch detection device, some methods such as an optical type, a resistance type and a capacitance type are known. Among these types, a capacitance type touch detection device has a relatively simple structure and consumes less power and so is used for mobile information terminals and the like. Japanese Patent Application Laid-Open Publication No. 2012-230657 (Patent Document 1) describes a capacitance type touch detection device.

Further, in the display device, the increase in size of a display surface has been more and more demanded. Correspondingly, the increase in size of the touch panel has also been demanded. On the other hand, the increase in size of the display device itself is not desirable because portability thereof is degraded. Thus, in order to achieve the increase in size of the display surface while suppressing the increase in size of the display device, a narrower edge frame of the display device is needed. Namely, the reduction in width of an edge frame surrounding the display surface of the display device has been demanded.

SUMMARY

In a capacitance type touch detection device, for example, proximity of an external object is detected by utilizing the change in the capacitance value at an intersecting portion where a drive electrode and a detection electrode intersect due to the proximity (including contact) of an external object such as a finger as described in Patent Document 1. Namely, proximity of an external object is detected based on a detection signal generated in the detection electrode when a drive signal is supplied to the drive electrode. In a touch detection device, a plurality of drive electrodes and a plurality of detection electrodes are provided, and the plurality of drive electrodes are sequentially arranged in a column direction and the plurality of detection electrodes are sequentially arranged in a row direction so as to intersect with the plurality of drive electrodes.

A circuit that forms a drive signal is formed in a region corresponding to the edge frame. When a region corresponding to the edge frame is made narrower so as to achieve the reduction in width of the edge frame, the region allocated to the circuit that forms a drive signal becomes narrower, and the driving ability of the circuit is degraded. When the driving ability is degraded, the voltage change of the drive electrode becomes slower and there arises a fear of deterioration of characteristics concerning the touch detection.

An object of the present invention is to provide a display device with a touch detection function capable of preventing the deterioration of characteristics of touch detection while suppressing the increase of the edge frame.

A display device according to an embodiment of the present invention includes: a pixel array including a plurality of pixels arranged in a matrix form and having a first side parallel to a row and a second side opposite to the first side; a plurality of scanning lines arranged in each row of the pixel array to supply a scanning signal to the plurality of pixels arranged in a corresponding row; a plurality of signal lines arranged in each column of the pixel array to supply an image signal to the plurality of pixels arranged in a corresponding column; a plurality of drive electrodes which are arranged in a column of the pixel array and to which a drive signal to detect an external proximate object is supplied; and a first drive electrode circuit which is arranged along the first side of the pixel array and connected to a plurality of control lines and the plurality of drive electrodes arranged in the pixel array and supplies the drive signal to, among the plurality of drive electrodes, the drive electrode specified by a selection signal supplied via the plurality of control lines.

Additional features and advantages are described herein, and will be apparent from the following Detailed Description and the figures.

BRIEF DESCRIPTION OF THE FIGURES

FIG. 3A and FIG. 3B are a plan view and a sectional view showing an overview of a module mounted with the liquid crystal display device with a touch detection function according to the first embodiment;

FIG. 15A to FIG. 15E are waveform charts showing an operation of the liquid crystal display device with a touch detection function according to the third embodiment.

DETAILED DESCRIPTION

Figure 1:
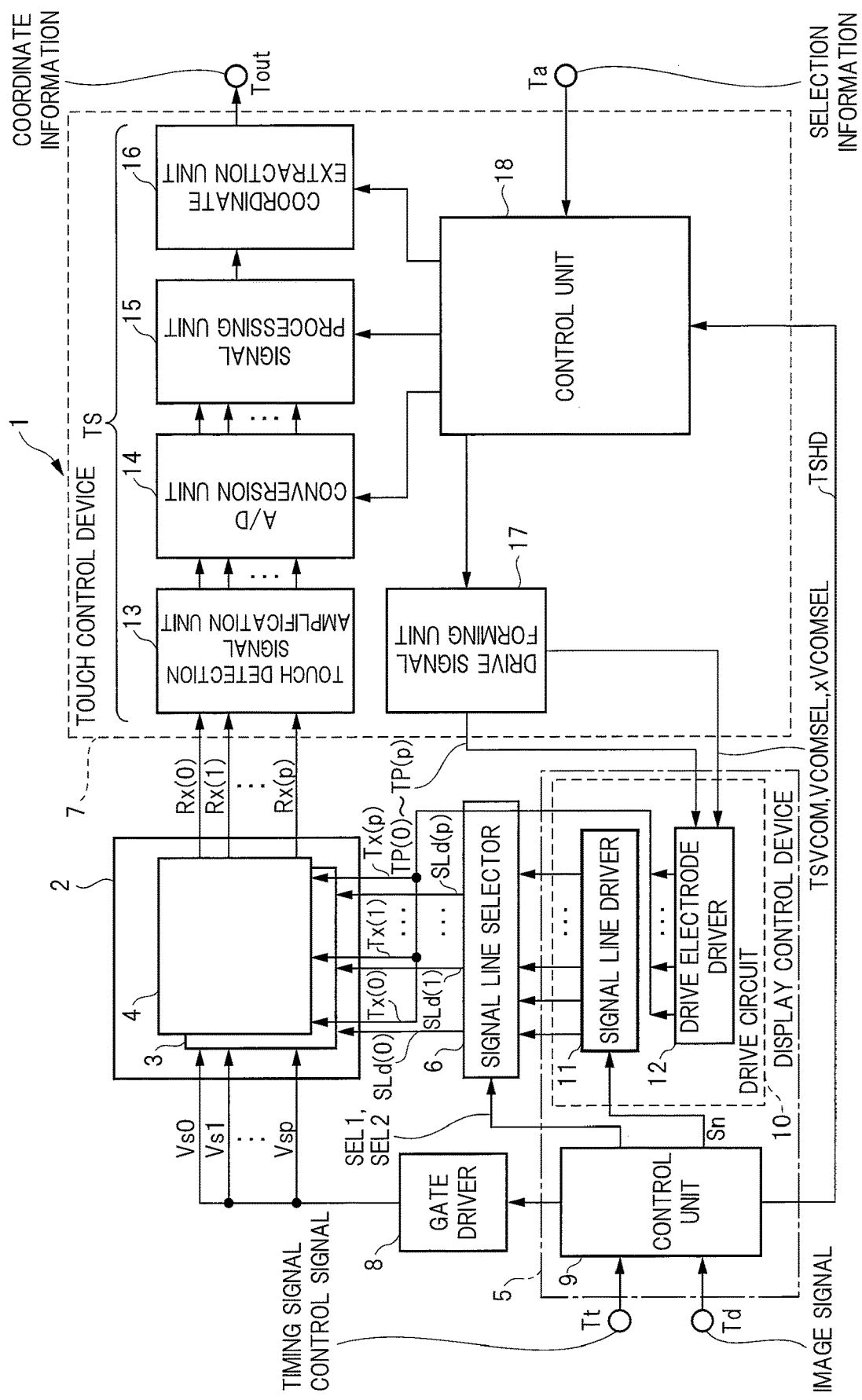
FIG. 1 is a block diagram showing the configuration of a liquid crystal display device with a touch detection function according to the first embodiment.

Hereinafter, each embodiment of the present invention will be described with reference to the drawings. However, the disclosure is only by way of example and inventions that can easily be anticipated by persons skilled in the art by making appropriate alterations without deviating from the spirit of the invention are naturally included in the scope of the present invention. Some drawings are shown schematically concerning the width, thickness, shape or the like of each portion when compared with an actual mode for the purpose of making the description clearly understood, but are provided only by way of example and do not intend to limit the interpretation of the present invention.

In this specification and each drawing, the same reference characters are attached to elements similar to those described in previous drawings and a detailed description thereof may be omitted.

In the following description, a liquid crystal display device with a touch detection function is taken as an example of a display device with a touch detection function. However, each embodiment is not limited to this and can also be applied to an OLED display device with a touch detection function. As described above, various methods are present as a touch detection method, and an example in which the capacitance type is adopted as the touch detection method will be described below. Further, there are a plurality of types of touch detection devices that adopt the capacitance type touch detection method, and a touch detection device using the mutual capacitance type touch detection method will be described as an example.

Further, in this specification, an example in which a touch detection device is applied to an in-cell type liquid crystal display device with a touch detection function integrated with a display device will be described. Here, the in-cell type liquid crystal display device with a touch detection function means a liquid crystal display device with a touch detection function in which at least one of the drive electrode and the detection electrode included in the touch detection device is provided between a pair of substrates opposed via the liquid crystal of the display device. Specifically, the case in which the drive electrode included in the touch detection device is used also as the drive electrode that drives the liquid crystal will be described. Since the drive electrode is commonly used as a drive electrode for touch detection and as a drive electrode for liquid crystal display, the drive electrode may be referred to also as a common electrode in the following description.

First Embodiment

<Basic Principle of Capacitance Type Touch Detection (Mutual Capacitance Type)>

Figure 2A:
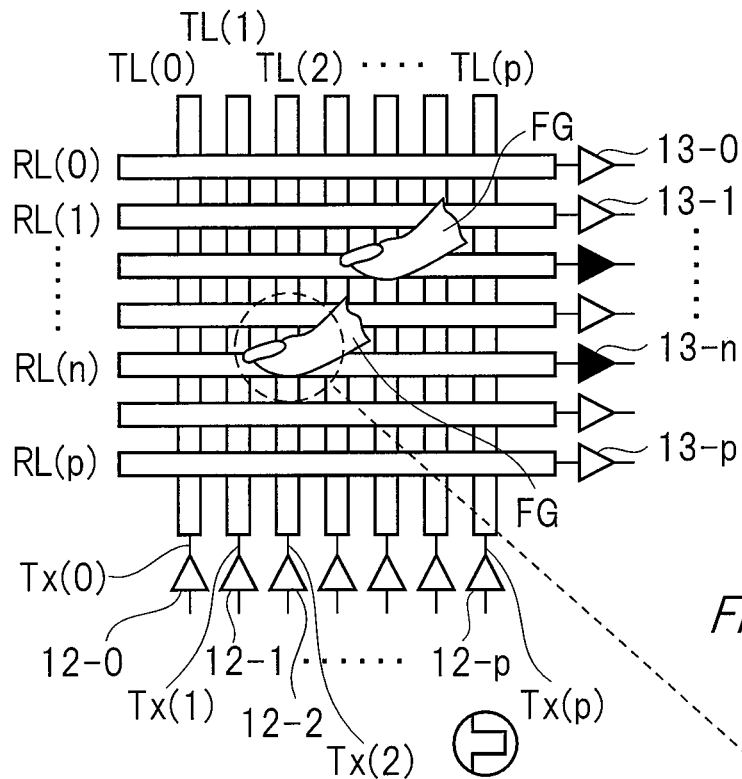
FIG. 2A to FIG. 2C are explanatory views for describing the basic principle of capacitance type touch detection (mutual capacitance type)
Figure 2B:
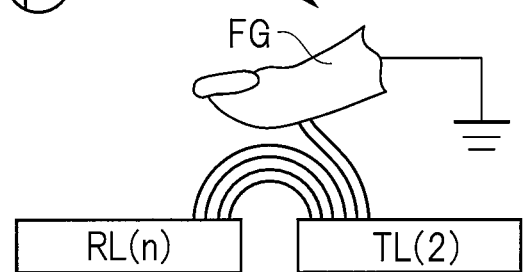
Figure 2C:
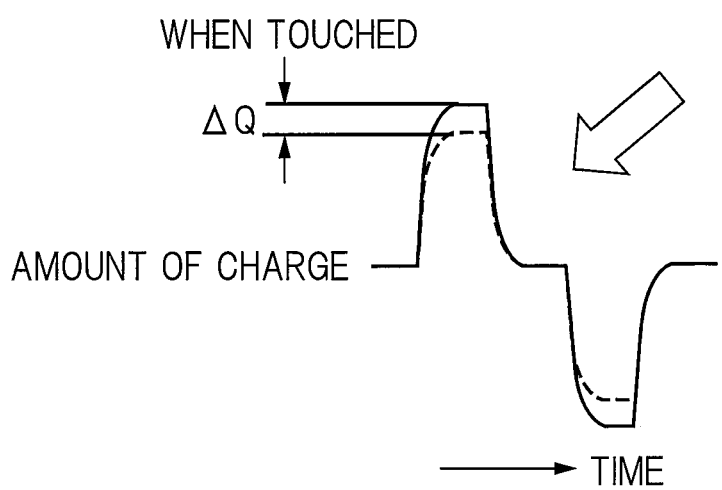

First, the basic principle of mutual capacitance type will be described. FIG. 2A to FIG. 2C are schematic diagrams showing the basic principle of the capacitance type touch detection adopted in the first to third embodiments described below. In FIG. 2A, each of TL(0) to TL(p) is a common electrode provided in a liquid crystal panel and each of RL(0) to RL(p) is a detection electrode provided in a touch detection panel unit. In FIG. 2A, each of the common electrodes TL(0) to TL(p) extends in a column direction and is arranged in parallel in a row direction. Also, each of the detection electrodes RL(0) to RL(p) extends in the row direction so as to intersect with the common electrodes TL(0) to TL(p) and is arranged in parallel in the column direction. The detection electrodes RL(0) to RL(p) are formed above the common electrodes TL(0) to TL(p) so that a gap is present between the detection electrodes RL(0) to RL(p) and the common electrodes TL(0) to TL(p).

In FIG. 2A, each of 12-0 to 12-$p$ schematically shows a unit drive electrode driver. In FIG. 2A, the drive signals Tx(0) to Tx(p) are output from the unit drive electrode drivers 12-0 to 12-$p$, respectively. Also, each of 13-0 to 13-p schematically shows a unit amplifier. In FIG. 2A, a pulse signal encircled by a solid line shows the waveform of the drive signal Tx(i). In FIG. 2A, a finger FG is shown as an external object.

In the example of FIG. 2, a pulse signal is supplied as the drive signal Tx(2) to the common electrode TL(2) from the unit drive electrode driver 12-2. By supplying the drive signal Tx(2) serving as a pulse signal to the common electrode TL(2), as shown in FIG. 2B, an electric field is generated between the common electrode TL(2) and the detection electrode RL(n) intersecting with the common electrode TL(2). If the finger FG touches a position near the common electrode TL(2) of the liquid crystal panel at this time, an electric field is generated also between the finger FG and the common electrode TL(2) and the electric field generated between the common electrode TL(2) and the detection electrode RL(n) decreases. Accordingly, the amount of charge between the common electrode TL(2) and the detection electrode RL(n) decreases. As a result, as shown in FIG. 2C, the amount of charge generated in response to the supply of the drive signal Tx(2) decreases by ΔQ when the finger FG touches compared with the case in which the finger FG does not touch. The difference in the amount of charge appears in the detection signal Rx(n) as a difference of voltage, and is supplied to the unit amplifier 13-n and then amplified.

In FIG. 2C, the horizontal axis represents the time and the vertical axis represents the amount of charge. The amount of charge increases (increases upward in FIG. 2C) in response to a rise of the drive signal Tx(2) and the amount of charge increases (increases downward in FIG. 2C) in response to a fall of the voltage of the drive signal Tx(2). At this time, an increased amount of charge changes depending on the presence or absence of the touch of the finger FG. Further, in this drawing, after the amount of charge increases upward, a reset of the amount of charge is carried out before the amount of charge increases downward. Similarly, after the amount of charge increases downward, a reset of the amount of charge is carried out before the amount of charge increases upward. In this manner, the amount of charge changes upward and downward on the basis of the reset amount of charge.

By sequentially supplying the drive signals Tx(0) to Tx(p) to the common electrodes TL(0) to TL(p), the detection signals Rx(0) to Rx(p) having the voltage value depending on whether the finger FG touches a position near the respective intersection portions are output from each of the plurality of detection electrodes RL(0) to RL(p) intersecting with the common electrode to which the drive signal Tx(i) is supplied. Each of the detection signals Rx(0) to Rx(p) is sampled and converted into a digital signal by the use of an analog/digital conversion unit (hereinafter, referred to as an A/D conversion unit) at the time when the difference AQ arises in the amount of charge. By performing signal processing of the digital signal converted by the A/D conversion unit, coordinates of the touched position are extracted.

<Overall Configuration>

Next, an overall configuration of a liquid crystal display device 1 with a touch detection function (hereinafter, simply referred to also as a liquid crystal display device) will be described with reference to FIG. 1. FIG. 1 is a block diagram showing the configuration of the liquid crystal display device 1 with a touch detection function. The liquid crystal display device 1 with a touch detection function includes a liquid crystal panel (display panel) 2, a display control device 5, a signal line selector 6, a touch control device 7 and a gate driver 8. In FIG. 1, the liquid crystal panel 2 is depicted schematically to make the drawing easier to view and includes a liquid crystal panel unit (display panel unit) 3 and a touch detection panel unit 4. The configuration of the liquid crystal panel 2 will be described below with reference to FIG. 3 and FIG. 4.

The liquid crystal panel unit 3 and the touch detection panel unit 4 share the drive electrodes. Scanning signals Vs0 to Vsp are supplied to the liquid crystal panel unit 3 from the gate driver 8 and image signals SLd(0) to SLd(p) are further supplied thereto from the display control device 5 via the signal line selector 6 to display images in accordance with the image signals SLd(0) to SLd(p). The touch detection panel unit 4 receives drive signals Tx(0) to Tx(p) supplied from the display control device 5 and outputs detection signals Rx(0) to Rx(p) to the touch control device 7.

The display control device 5 has a control unit 9 and a drive circuit 10, and the drive circuit 10 includes a signal line driver 11 that forms and outputs image signals and a drive electrode driver 12 that outputs the drive signals Tx(0) to Tx(p). The control unit 9 receives a timing signal and a control signal supplied to a control terminal Tt and an image signal supplied to an image terminal Td and supplies an image signal Sn in accordance with the image signal supplied to the image terminal Td to the signal line driver 11. Though not particularly limited, the signal line driver 11 temporally multiplexes the image signals Sn supplied from the control unit 9 and outputs the multiplexed signal to the signal line selector 6. Namely, when one output terminal of the signal line driver 11 is viewed, two image signals are output from one terminal while being temporally shifted.

Also, the control unit 9 supplies selection signals SEL1 and SEL2 to distribute temporally multiplexed image signals to mutually different signal lines in the signal line selector 6 to the signal line selector 6. The signal line selector 6 distributes the image signals supplied after being multiplexed to mutually different signal lines based on the selection signals SEL1 and SEL2 and supplies the image signals as the image signals SLd(0) to SLd(p) to the liquid crystal panel unit 3. The signal line selector 6 is disposed near the liquid crystal panel unit 3. By temporally multiplexing image signals as described above, the number of wires to electrically connect the display control device 5 and the liquid crystal panel unit 3 can be reduced. In other words, the delay of image signals can be reduced by increasing the line width of the wire connecting the display control device 5 and the liquid crystal panel unit 3.

The control unit 9 supplies a timing signal to the gate driver 8 based on a timing signal and a control signal supplied to the control terminal Tt. The gate driver 8 generates and supplies the scanning signals Vs0 to Vsp to the liquid crystal panel unit 3 based on the supplied timing signals. The scanning signals Vs0 to Vsp generated by the gate driver 8 are, for example, pulse signals which become higher in level sequentially from the scanning signal Vs0 to the scanning signal Vsp.

The drive electrode driver 12 in the drive circuit 10 receives selection signals TP(0) to TP(p) supplied from the touch control device 7 and supplies the drive signals Tx(0) to Tx(p) to a plurality of the common electrodes TL(0) to TL(p) included in the liquid crystal panel 2. In the first embodiment, though not particularly limited, the drive signals Tx(0) to Tx(p) and the selection signals TP(0) to TP(p) correspond to each other in a one-to-one manner. At the time of the touch detection, common electrodes that detect the touch (hereinafter, referred to as selected common electrodes) and common electrodes that do not detect the touch (hereinafter, referred to as non-selected common electrodes) are selected from the plurality of common electrodes TL(0) to TL(p). The selection is made by specifying the selected common electrodes based on the selection signals TP(0) to TP(p).

For example, when the selection signal TP(i) specifies the common electrode TL(i) as the selected common electrode, the drive electrode driver 12 outputs the drive signal Tx(i) corresponding to the selection signal TP(i) as a clock signal whose voltage changes periodically. At this time, for example, if the selection signal TP(n) specifies the common electrode TL(n) as a non-selected common electrode, the drive electrode driver 12 fixes the drive signal Tx(n) corresponding to the selection signal TP(n) to a predetermined voltage. As described with reference to FIG. 2, whether or not the neighborhood of the common electrode is touched can be detected based on the periodical change of the voltage of the common electrode.

In the first embodiment, though not particularly limited, the touch control device 7 forms the selection signals TP(0) to TP(p) in accordance with selection information supplied to an external terminal Ta. Thus, by specifying an arbitrary common electrode as a selected common electrode in accordance with the selection information, whether or not the neighborhood of a selected common electrode is touched can be detected.

In the first embodiment, though not particularly limited, the touch control device 7 sets a selection signal corresponding to a selected common electrode to, for example, a high level in accordance with the selection information and sets a selection signal corresponding to a non-selected common electrode to a low level. Also, the touch control device 7 outputs a control signal (clock signal) TSVCOM whose voltage changes periodically when detecting a touch. The drive electrode driver 12 receives the selection signals TP(0) to TP(p) and the control signal TSVCOM and outputs the control signal TSVCOM as a drive signal corresponding to a selection signal set to the high level. Also, the drive electrode driver 12 outputs a ground voltage as a drive signal corresponding to a selection signal set to the low level.

The liquid crystal display device 1 with a touch detection function according to the first embodiment is of an in-cell type, and the drive electrode TL(i) is used for both of the driving of touch detection and the driving of liquid crystal. Namely, the drive electrode TL(i) functions to form an electric field for driving the liquid crystal between the drive electrode and a pixel electrode described below at the time of the image display and functions to transmit a drive signal for touch detection at the time of the touch detection. The image display by the liquid crystal in the liquid crystal panel unit 3 and the touch detection in the touch detection panel unit 4 are performed in a time-sharing manner so as to avoid temporal overlapping. Namely, the display period in which an image is displayed and the touch detection period in which the touch detection is performed are generated in a time-sharing manner so as not to be overlapped.

The drive electrode driver 12 supplies the drive signal Tx(i) to drive the liquid crystal to the common electrode TL(i) in the liquid crystal panel 2 in the display period in which the image display is performed, and supplies the drive signal Tx(i) for touch detection to the common electrode TL(i) in the liquid crystal panel 2 in the touch detection period in which the touch detection is performed. Naturally, a drive electrode driver for touch detection and a drive electrode driver for driving liquid crystal may be separately provided in the drive circuit 10. In addition, the control unit 9 outputs a touch-display synchronizing signal TSHD that distinguishes between the display period and the touch detection period.

The touch control device 7 includes a detection signal processing unit TS that processes the detection signals Rx(0) to Rx(p) from the touch detection panel unit 4, a drive signal forming unit 17 that forms the selection signals TP(0) to TP(p) and control signals TSVCOM, VCOMSEL and xVCOMSEL supplied to the drive electrode driver 12, and a control unit 18 that controls the detection signal processing unit TS and the drive signal forming unit 17. Here, the detection signal processing unit TS detects whether the touch detection panel unit 4 is touched, and if it is touched, the detection signal processing unit TS performs the processing to determine coordinates of the touched position. Also, the drive signal forming unit 17 specifies and controls an area where a touch is detected in the touch detection panel unit 4.

The detection signal processing unit TS will be first described. The detection signal processing unit TS includes a touch detection signal amplification unit 13 that receives the detection signals Rx(0) to Rx(p) from the touch detection panel unit 4 and amplifies the received detection signals Rx(0) to Rx(p) and an A/D conversion unit 14 that converts an analog detection signal amplified by the touch detection signal amplification unit 13 into a digital signal. Here, the touch detection signal amplification unit 13 performs an amplification operation by removing high frequency components (noise components) from the received detection signals Rx(0) to Rx(p). Also, as described above with reference to FIG. 2, the detection signals Rx(0) to Rx(p) are generated in response to the drive signal Tx(i) supplied to the common electrode TL(i). Thus, in the first embodiment, the A/D conversion unit 14 is controlled by the control unit 18 so as to sample an amplified signal from the touch detection signal amplification unit 13 and convert it into a digital signal in synchronization with the drive signal Tx(i).

Further, the detection signal processing unit TS includes a signal processing unit 15 that receives the digital signal obtained by the conversion operation of the A/D conversion unit 14 and performs signal processing on the digital signal and a coordinate extraction unit 16 that extracts coordinates of the touched position from the signal obtained by the processing of the signal processing unit 15. The signal processing performed by the signal processing unit 15 includes the processing to remove noise components of higher frequencies than the sampling frequency by the A/D conversion unit 14 and detect whether the touch detection panel unit 4 is touched. Coordinates of the touched position extracted by the coordinate extraction unit 16 are output from an output terminal Tout as coordinate information.

The drive signal forming unit 17 forms the selection signals TP(0) to TP(p) and the control signals TSVCOM, VCOMSEL and xVCOMSEL based on a control signal from the control unit 18 and supplies these signals to the drive electrode driver 12. The control unit 18 receives the touch-display synchronizing signal TSHD output from the control unit 9 of the display control device 5 and selection information via the external terminal Ta, and when the touch-display synchronizing signal TSHD indicates the touch detection period, the control unit 18 controls the drive signal forming unit 17 to form the selection signals TP(0) to TP(p) and the control signals TSVCOM, VCOMSEL and xVCOMSEL.

Namely, the control unit 18 controls the drive signal forming unit 17 so that selection signals corresponding to common electrodes specified by selection information are at a high level and remaining selection signals are at a low level. Also, in the touch detection period, the control unit 18 controls the drive signal forming unit 17 so that the drive signal forming unit 17 outputs the control signal TSVCOM whose voltage changes periodically and the control signal VCOMSEL that becomes a high level in the touch detection period. The control signal xVCOMSEL is a control signal obtained by inverting the phase of the control signal VCOMSEL. Namely, the control signal xVCOMSEL becomes a low level in the touch detection period. Also, the control unit 18 controls the A/D conversion unit 14, the signal processing unit 15 and the coordinate extraction unit 16 so that the detection signals Rx(0) to Rx(p) received by the touch detection signal amplification unit 13 are converted and touched coordinates are extracted in the touch detection period.

<Module>

FIG. 3A is a plan view showing an overview of a module in which the liquid crystal display device 1 with a touch detection function according to the first embodiment is mounted. FIG. 3B is a sectional view of the line B-B' in FIG. 3A.

The liquid crystal panel 2 includes signal lines SL(0) to SL(p) extending in a longitudinal direction in FIG. 3A and arranged in parallel in a lateral direction and a plurality of common electrodes TL(0) to TL(p) extending in the same direction as the extending direction of the signal lines SL(0) to SL(p). Namely, the common electrodes TL(0) to TL(p) also extend in the longitudinal direction in FIG. 3A and are arranged in parallel in the lateral direction. Note that scanning lines to which the selection signals Vs0 to Vsp are supplied and the detection electrodes RL(0) to RL(p) that transmit the detection signals Rx(0) to Rx(p) extend in the lateral direction and are arranged in parallel in the longitudinal direction, but are omitted in FIG. 3A.

In FIG. 3A, 2-U denotes a short side (first side) of the liquid crystal panel 2 and 2-D denotes a short side (second side) of the liquid crystal panel 2 opposite to the short side 2-U. Further, 2-L denotes a long side of the liquid crystal panel 2 and 2-R denotes a long side of the liquid crystal panel 2 opposite to the long side 2-L. Here, each of the short sides 2-U and 2-D is a side parallel to the scanning lines and the detection electrodes RL(0) to RL(p) and each of the long sides 2-L and 2-R is a side parallel to the signal lines SL(0) to SL(p) and the common electrodes TL(0) to TL(p).

The display control device 5 and the signal line selector 6 described with reference to FIG. 1 are arranged along the short side 2-D of the liquid crystal panel 2. Namely, the display control device 5 and the signal line selector 6 extend in a direction perpendicular to the signal lines SL(0) to SL(p) and the common electrode TL(0) to TL(p). As will be described below with reference to FIG. 5, the signal line selector 6 is formed on the same substrate as the liquid crystal panel 2, the signal lines SL(0) to SL(p) are connected to the signal line selector 6, and an image signal output from the display control device 5 is supplied to the signal lines SL(0) to SL(p) of the liquid crystal panel 2 via the signal line selector 6. Here, signals supplied from the display control device 5 to the signal line selector 6 are an image signal and a selection signal. Since the liquid crystal panel 2 performs a color display, the image signals supplied from the display control device 5 to the signal line selector 6 are image signals of R (red), G (green) and B (blue) corresponding to three primary colors and are shown as R/G/B in FIG. 3A. Also, selection signals are shown as SEL1 and SEL2 in FIG. 3A. The signal line selector 6 and the signal line driver 11 are related to the signal lines SL(0) to SL(p) and so can be regarded as a signal line circuit, and the signal line circuit can be regarded as being arranged along the short side 2-D of the liquid crystal panel 2.

Each of the signal lines SL(0) to SL(p) is formed on one main surface of a TFT substrate 300 serving as a glass substrate. In the module shown in FIG. 3, a plurality of signal lines (for example, signal lines SL(0)0 and SL(0)1) correspond to one common electrode (for example, the common electrode TL(0)) and each of the signal lines SL(0)0 and SL(0)1 includes three signal lines corresponding to the image signals R, G and B. FIG. 3B shows signal lines SL(0)0(R), SL(0)0(G) and SL(0)0(B) corresponding to the image signals R, G and B included in the signal line SL(0)0 and signal lines SL(1)0(R), SL(1)0(G) and SL(1)0(B) corresponding to the image signals R, G and B included in the signal line SL(1).

Here, the notation of the signal lines used in this specification will be described. When described with respect to the signal line SL(0)0(R) and the signal line SL(1)0(R), the number in ( ) indicates the number of the corresponding common electrode, the next number indicates the number of the pixel in the corresponding common electrode, and the alphabet in ( ) indicates the three primary colors (R, G, B) of the pixel. Namely, the signal line SL(0)0(R) indicates a signal line that corresponds to the common electrode TL(0) and transmits an image signal corresponding to red of the three primary colors in the 0-th pixel. Similarly, the signal line SL(1)0(R) indicates a signal line that corresponds to the common electrode TL(1) arranged next to the common electrode TL(0) and transmits an image signal corresponding to red of the three primary colors in the 0-th pixel. Therefore, SL(1)1(R) and SL(1)1(G) shown in FIG. 3B indicate signal lines that correspond to the common electrode TL(1) and transmit image signals corresponding to red and green of the three primary colors in the first pixel.

As shown in FIG. 3B, an insulating layer 301 is further formed on one main surface of the signal lines SL(0)0(R), SL(0)0(G), SL(0)0(B) and the like corresponding to the image signals R, G and B and on one main surface of the TFT substrate 300, and the common electrodes TL(0) to TL(p) are formed on the insulating layer 301. An auxiliary electrode SM is formed in each of these common electrodes TL(0) to TL(p) and the auxiliary electrode SM is electrically connected to the common electrode to reduce electric resistance of the common electrode. An insulating layer 302 is formed on the top surface of the common electrodes TL(0) to TL(p) and the auxiliary electrode SM and a pixel electrode LDP is formed on the top surface of the insulating layer 302. In FIG. 3B, each of CR, CB and CG is a color filter and a liquid crystal layer 303 is sandwiched between the color filters CR (red), CG (green) and CB (blue) and the insulating layer 302. Here, the pixel electrode LDP is provided at an intersection of a scanning line and a signal line, and the color filter CR, CG or CB corresponding to each of the pixel electrodes LDP is provided above each pixel electrode LDP. A black matrix BM is provided between the respective color filters CR, CG and CB.

Figure 4A:
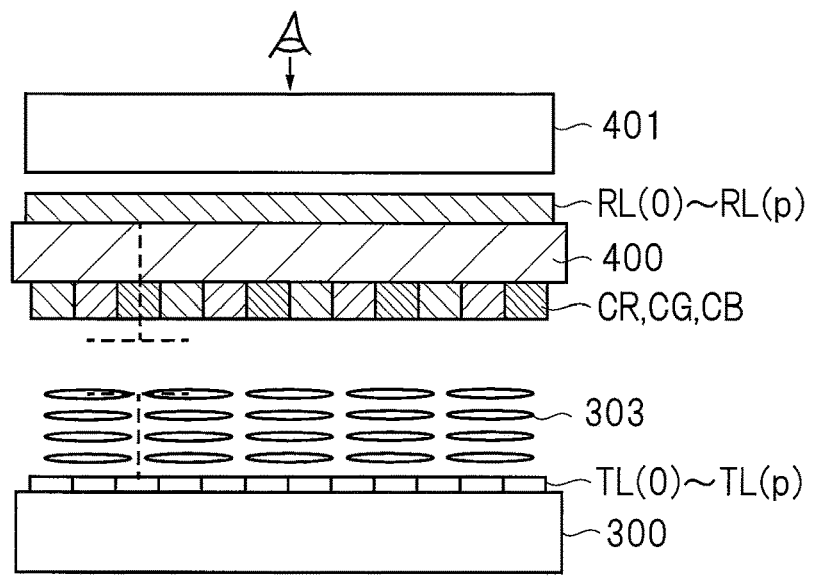
FIG. 4A to FIG. 4C are a sectional view and plan views showing an overview of the module mounted with the liquid crystal display device with a touch detection function according to the first embodiment.

FIG. 4 is a schematic diagram showing a relationship between the detection electrodes RL(0) to RL(p) and the common electrodes TL(0) to TL(p). As shown in FIG. 4A, a CF glass substrate 400 serving as a glass substrate is provided on the upper surface of the color filters CR, CG and CB and the detection electrodes RL(0) to RL(p) are formed on the upper surface of the CF glass substrate 400. Further, a polarizing plate 401 is formed above the detection electrodes RL(0) to RL(p). Note that, since the case of being viewed from above is taken as an example as shown in FIG. 4A, the surface is mentioned as the upper surface, but it is needless to say that the upper surface may be a lower surface or a side surface when the direction of viewing changes. Further, an electrode of a capacitive element formed between the detection electrodes RL(0) to RL(p) and the common electrodes TL(0) to TL(p) is depicted by a broken line in FIG. 4A.

Figure 4B:
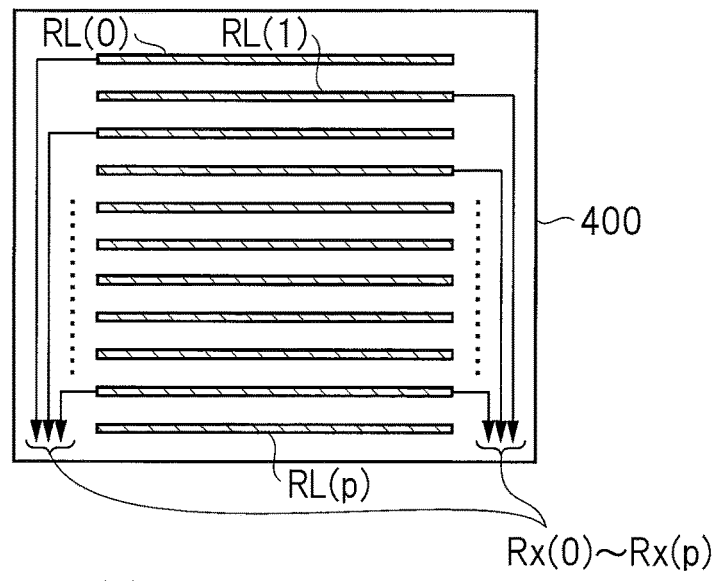
Figure 4C:
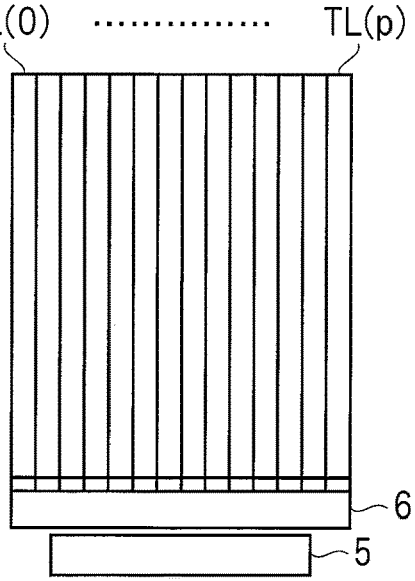

As shown in FIG. 3A and FIG. 4C, each of the signal lines SL(0) to SL(p) and the common electrodes TL(0) to TL(p) extends in a longitudinal direction, that is, in a long side direction and is arranged in parallel in a lateral direction, that is, in a short side direction. Meanwhile, the detection electrodes RL(0) to RL(p) are provided on the CF glass substrate 400 and arranged so as to intersect with the common electrodes TL(0) to TL(p) as shown in FIG. 4B. Namely, in FIG. 4B, the detection electrodes RL(0) to RL(p) extend in the lateral direction (short side) and are arranged in parallel in the longitudinal direction (long side). The detection signals Rx(0) to Rx(p) from the respective detection electrodes RL(0) to RL(p) are supplied to the touch control device 7. In the first embodiment, though not particularly limited, as shown in FIG. 4B, the detection signals Rx(0) to Rx(p) are alternately fetched.

When viewed in a plan view, the signal lines SL(0) to SL(p) and the common electrodes TL(0) to TL(p) can be regarded as extending in parallel as shown in FIG. 3A. "Parallel" means the state in which electrodes extend from one end to the other end without intersecting with each other, and even when a part or whole of one line is provided in an inclined state with respect to the other line, the state is assumed to be "parallel" if these lines do not intersect between one end and the other end.

Also, when the arrangement of the common electrodes TL(0) to TL(p) is viewed based on the signal line selector 6 and the display control device 5 as a reference point, each of the common electrodes TL(0) to TL(p) can be regarded as extending in a direction away from the signal line selector 6 and the display control device 5 as a reference point. In this case, the signal lines SL(0) to SL(p) can also be regarded as extending in a direction away from the signal line selector 6 and the display control device 5 as a reference point.

Note that the signal lines and the pixel electrodes LDP shown in FIG. 3B are omitted in FIG. 4A.

<Overall Configuration of Module>

Figure 5:
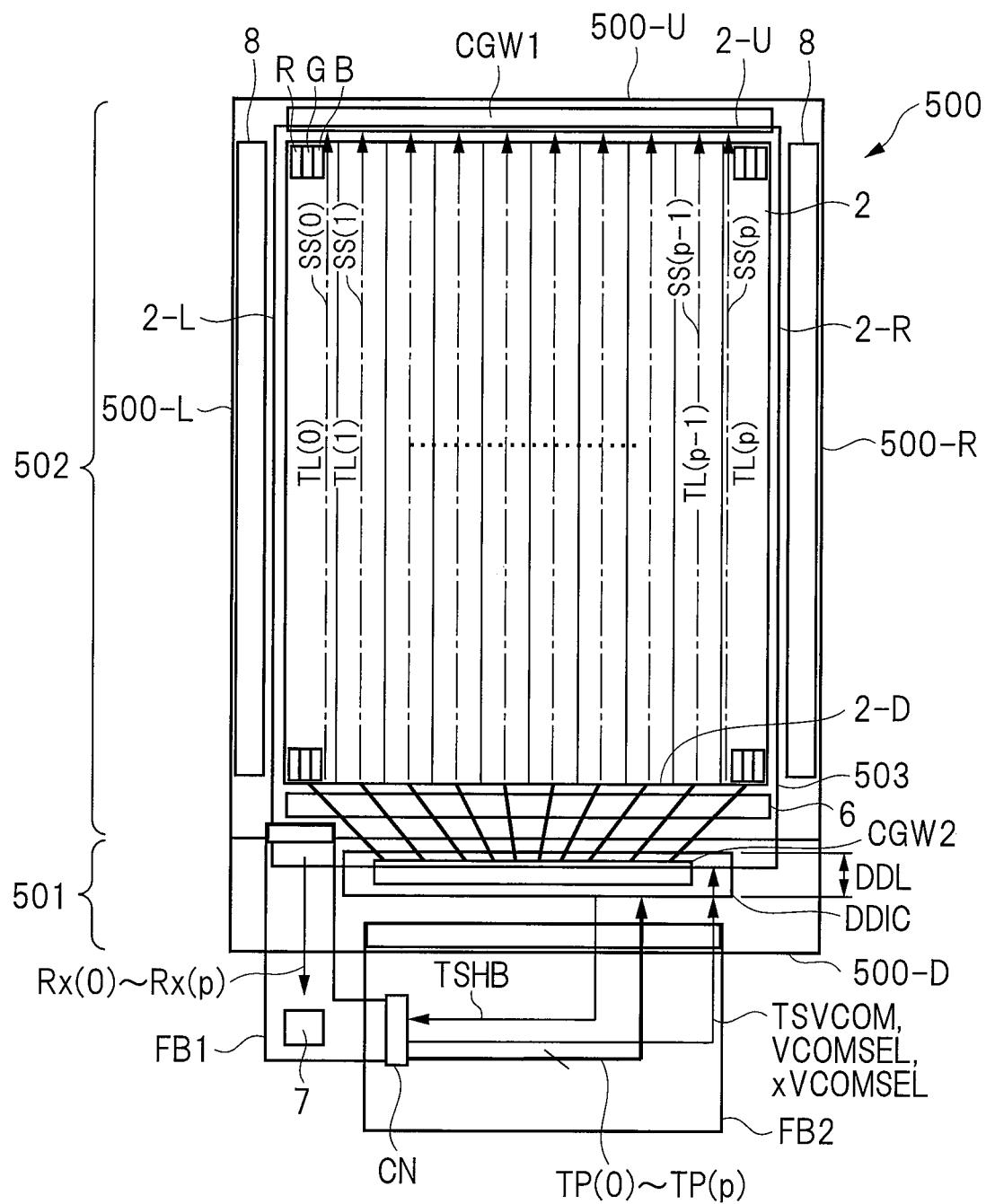
FIG. 5 is a plan view showing a configuration of the module mounted with the liquid crystal display device with a touch detection function according to the first embodiment.

FIG. 5 is a schematic plan view showing an overall configuration of a module according to an embodiment and shows the overall configuration of a module 500 mounted with the liquid crystal display device 1 with a touch detection function. Though schematically, FIG. 5 is depicted in conformity to an actual arrangement.

FIG. 5 shows the overall configuration of modules according to the second and third embodiments described below in addition to that according to the first embodiment. Components according to the second and third embodiments will be described in detail below and so will be briefly described here.

In FIG. 5, a reference character 501 denotes an area of the TFT substrate 300 described with reference to FIG. 3 and a reference character 502 denotes an area having the TFT substrate 300 and the CF glass substrate 400 described with reference to FIG. 4. In the module 500, the TFT substrate 300 is integrated. Namely, the TFT substrate 300 is common in the area 501 and the area 502, and the CF glass substrate 400, the detection electrodes RL(0) to RL(p), the polarizing plate 401 and the like are further formed on the upper surface of the TFT substrate 300 in the area 502 as shown in FIG. 4.

In FIG. 5, 500-U denotes a short side of the module 500 and 500-D denotes a short side of the module 500 opposite to the short side 500-U. Also, 500-L denotes a long side of the module 500 and 500-R denotes a long side of the module opposite to the long side 500-L.

In the area 502, the gate driver 8 shown in FIG. 1 is mounted along the long sides 500-L and 500-R of the module 500. Namely, the gate drivers 8 are mounted between the two long sides 500-L and 500-R of the module 500 and the two long sides 2-L and 2-R of the liquid crystal panel 2 in the state of sandwiching the plurality of common electrodes TL(0) to TL(p) therebetween. In this case, the scanning lines described with reference to FIG. 1 extend along the short sides 500-U and 500-D of the module and are arranged in parallel in the direction of the long sides 500-L and 500-R, and are connected to the gate driver 8. Also, the signal line selector 6 described above is mounted in the area 502. In the first embodiment, the signal line selector 6 is arranged along the short side 2-D of the liquid crystal panel 2.

Meanwhile, the display control device 5 is mounted in the area 501. In the first embodiment, the display control device 5 is made up of a semiconductor integrated circuit device (hereinafter, referred to also as a semiconductor device) and a plurality of electronic components. The electronic components include a field effect transistor (hereinafter, referred to as MOSFET). A plurality of MOSFETs are formed on the TFT substrate 300, and the plurality of MOSFETs are formed in an area of the TFT substrate 300 covered with the semiconductor device constituting the display control device 5. A second circuit CGW2 constituted of the plurality of MOSFETs covered with the semiconductor device is different in the respective embodiments as will be described in detail below. The configuration of the second circuit CGW2 according to the first embodiment will be described in detail below with reference to FIG. 7 to FIG. 9. The semiconductor device mounted so as to cover the second circuit CGW2 includes the control unit 9 shown in FIG. 1 and the signal line driver 11 (FIG. 1).

The semiconductor device mounted so as to cover the second circuit CGW2 is shown as DDIC in FIG. 5. The semiconductor device DDIC includes the signal line driver 11 (FIG. 1) that drives the signal lines SL(0) to SL(p) and so will be referred to as a semiconductor device for driver below. In the first embodiment, though not particularly limited, the number of the semiconductor devices for driver DDIC is one. The display control device 5 shown in FIG. 1 is made up of the one semiconductor device for driver DDIC, the second circuit CGW2 constituted of the plurality of MOSFETs formed to be sandwiched between the semiconductor device for driver DDIC and the TFT substrate 300, and a first circuit CGW1 described below. However, the semiconductor device for driver DDIC may include only the signal line driver 11 shown in FIG. 1 and another semiconductor device may include the control unit 9 shown in FIG. 1.

The output of the signal line driver 11 (FIG. 1) in the semiconductor device for driver DDIC is supplied to the signal lines SL(0) to SL(p) via the signal line selector 6. The second circuit CGW2 receives the selection signals TP(0) to TP(p) and the control signals VCOMSEL and xVCOMSEL from the touch control device 7 and outputs the selection signals TP(0) to TP(p) in the touch detection period. The selection signals TP(0) to TP(p) output from the second circuit CGW2 are supplied to the first circuit CGW1 via control lines SS(0) to SS(p) corresponding to the common electrodes TL(0) to TL(p) in a one-to-one manner. The control lines SS(0) to SS(p) are arranged in the liquid crystal panel 2.

In the first embodiment, at least some of the plurality of signal lines SL(0) to SL(p) are used as the control lines SS(0) to SS(p) in the touch detection period. Namely, at least some signal lines of the plurality of signal lines constituting the respective signal lines SL(0) to SL(p) are used also as the control lines SS(0) to SS(p). Thus, the output of the second circuit CGW2 is transmitted to some of the signal lines via the signal line selector 6 and supplied to the first circuit CGW1 in the touch detection period.

Though omitted in FIG. 5, the semiconductor device for driver DDIC supplies a timing signal to the gate driver 8. The gate driver 8 forms the scanning signals Vs0 to Vsp in accordance with the supplied timing signal and supplies the signals to the scanning lines (not shown).

The detection electrodes RL(0) to RL(p) described with reference to FIG. 4 are connected to a flexible cable FB1 via a wire arranged between the long sides 500-L and 500-R of the module 500 and the long sides 2-L and 2-R of the display panel 2. The touch control device 7 described with reference to FIG. 1 is mounted to the flexible cable FB1 and the detection signals Rx(0) to Rx(p) in the detection electrodes RL(0) to RL(p) are supplied to the touch control device 7 via wires in the flexible cable FB1. Also, a flexible cable FB2 is connected to the area 501 and terminals of the semiconductor device for driver DDIC and the second circuit CGW2 are connected to wires in the flexible cable FB2.

Further, a connector CN is mounted to the flexible cable FB2. The flexible cables FB1 and FB2 are electrically connected via the connector CN. A plurality of signals are transmitted/received between the semiconductor device for driver DDIC and second circuit CGW2 and the touch control device 7 via the connector CN. In the first embodiment, though not particularly limited, the touch control device 7 is made up of one semiconductor device. To distinguish from the semiconductor device for driver, the semiconductor device constituting the touch control device 7 is referred to as the semiconductor device for touch 7.

In FIG. 5, among the plurality of signals transmitted/received between the semiconductor device for driver DDIC and second circuit CGW2 and the semiconductor device for touch 7, only the touch-display synchronizing signal TSHD and the control signals TSVCOM, VCOMSEL and xVCOMSEL are shown. As described with reference to FIG. 1, the touch-display synchronizing signal TSHD is a control signal that distinguishes between the display period and the touch detection period. The control signal TSVCOM is, as described above, a clock signal whose voltage changes periodically in the touch detection period. The control signal TSVCOM serving as a clock signal is supplied to the selected common electrode TL(i) selected to detect a touch as the drive signal Tx(i) in the touch detection period. Thus, the control signal TSVCOM can be regarded as a common drive signal.

In the first embodiment, the control signal (common drive signal) TSVCOM and the control signals VCOMSEL and xVCOMSEL are supplied from the semiconductor device for touch 7 to a signal wire 503 via the connector CN. The signal wire 503 is arranged so as to surround the liquid crystal panel 2. Namely, the signal wire 503 is arranged in an area between the long sides 500-L and 500-R of the module 500 and the long sides 2-L and 2-R of the liquid crystal panel 2 and in an area between the short sides 500-U and 500-D of the module 500 and the short sides 2-U and 2-D of the liquid crystal panel 2. The signal wire 503 is connected to the first circuit CGW1 and the control signal (common drive signal) TSVCOM and the control signals VCOMSEL and xVCOMSEL are supplied from the semiconductor device for touch 7 to the first circuit CGW1 via the signal wire 503.

In the module 500 shown in FIG. 5, the first circuit CGW1 and the second circuit CGW2 are arranged along the two short sides 2-U and 2-D of the display panel 2. Namely, the module 500 includes the first circuit CGW1 arranged along the one short side 2-U of the display panel 2 and the second circuit CGW2 arranged along the other short side 2-D of the display panel 2. In FIG. 5, the second circuit CGW2 arranged along the other short side 2-D of the display panel 2 is covered with the semiconductor device for driver DDIC. Also, the first circuit CGW1 arranged along the one short side 2-U of the display panel 2 is formed between the short side 2-U of the display panel 2 and the short side 500-U of the module 500. Though not particularly limited, the first circuit CGW1 is also constituted of the MOSFET formed on the TFT substrate 300.

In the first embodiment, the second circuit CGW2 supplies the selection signals TP(0) to TP(p) to the first circuit CGW1 via the control lines SS(0) to SS(p) arranged in the liquid crystal panel 2 in the touch detection period. The first circuit CGW1 supplies the control signal TSVCOM to a selected common electrode and supplies a predetermined voltage to a non-selected common electrode in accordance with the supplied selection signals TP(0) to TP(p). Namely, in the touch detection period, the drive signals Tx(0) to Tx(p) are supplied from the first circuit CGW1 to the common electrodes TL(0) to TL(p). Therefore, in the first embodiment, the first circuit CGW1 can be regarded as a drive electrode circuit (first drive electrode circuit).

The second circuit CGW2 only needs to transmit the selection signals TP(0) to TP(p) to the control line SS(0) to SS(p) in the touch detection period and so may have a low driving ability. Thus, the area where the second circuit CGW2 is formed can be made smaller.

The size of an edge frame (upper and lower frame) of the liquid crystal display device 1 with a touch detection function depends on the size of an area between the short side 500-D of the module 500 and the short side 2-D of the display panel 2. For the reduction in width of the edge frame, a short side DDL of the semiconductor device for driver DDIC is made shorter. In the first embodiment, the area occupied by the second circuit CGW2 can be made smaller and thus the reduction in width of the edge frame can be achieved while maintaining a state in which the second circuit CGW2 is covered with the semiconductor device for driver DDIC.

Further, in the first embodiment, instead of arranging signal wires that transmit the selection signals TP(0) to TP(p) in the area between the long sides 500-L and 500-R of the module 500 and the long sides 2-L and 2-R of the liquid crystal panel 2, the control lines arranged in the liquid crystal panel 2 are used. Thus, it is possible to suppress the increase of the edge frame (transverse edge frame) that depends on the size of the area between the long sides 500-L and 500-R of the module 500 and the long sides 2-L and 2-R of the liquid crystal panel 2.

Accordingly, the liquid crystal display device 1 capable of achieving the reduction in width of the edge frame can be provided.

Further, in the first embodiment, at least some of the signal lines SL(0) to SL(p) are used as the control lines SS(0) to SS(p) in the touch detection period and thus there is no need to provide a new wire in the liquid crystal panel 2. Accordingly, it is possible to suppress the cost increase.

Though not particularly limited, the semiconductor device for driver DDIC is formed as Chip On Glass (COG). Also, each of the signal line selector 6 and the gate driver 8 may be constituted of a semiconductor device. Also in such a case, the semiconductor device may be formed as COG. In FIG. 5, R, G and B shown on four sides of the liquid crystal panel 2 indicate sub-pixels constituting one pixel.

<Liquid Crystal Element Array>

Figure 6:
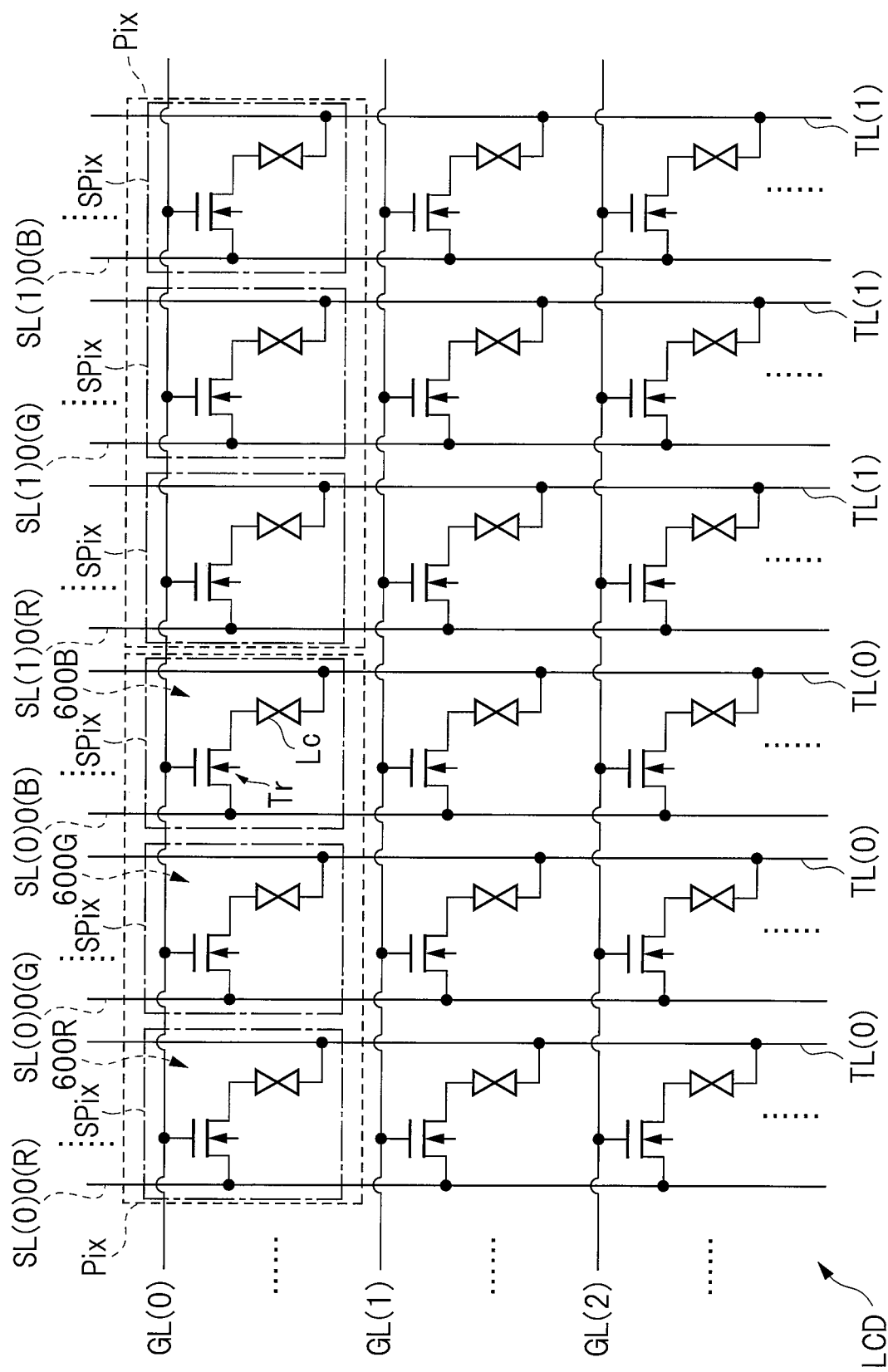
FIG. 6 is a circuit diagram showing the configuration of a pixel array according to the first embodiment.

Next, the circuit configuration of the liquid crystal panel 2 will be described. FIG. 6 is a circuit diagram showing a circuit configuration of the liquid crystal panel 2. In FIG. 6, each of a plurality of reference characters SPix indicated by a one-dot chain line denotes one liquid crystal display element (pixel). The liquid crystal display elements (pixels) SPix are arranged in a matrix form in the liquid crystal panel 2 to constitute a liquid crystal element array (pixel array) LCD. The liquid crystal element array (pixel array) LCD includes the plurality of scanning lines GL(0) to GL(p) arranged in each row and extending in the row direction and the signal lines SL(0)0(R), SL(0)0(G) and SL(0)0(B) to SL(p)p(R), SL(p)p(G) and SL(p)p(B) arranged in each column and extending in the column direction. The liquid crystal element array LCD further includes the common electrodes TL(0) to TL(p) arranged in each column and extending in the column direction. FIG. 6 shows a part of the liquid crystal element array (pixel array) relating to the scanning lines GL(0) to GL(2), the signal lines SL(0)0(R), SL(0)0(G) and SL(0)0(B) to SL(1)0(R), SL(1)0(G) and SL(1)0(B), and the common electrodes TL(0) and TL(1).

In FIG. 6, to make the description easier, the common electrodes TL(0) and TL(1) are depicted as if they are arranged in respective columns, but it should be understood that one common electrode is arranged for a plurality of signal lines as described with reference to FIG. 3A and FIG. 3B. Naturally, the common electrodes may be arranged in respective columns of the liquid crystal element array LCD as shown in FIG. 6. In any case, each of the common electrodes TL(0) to TL(p) is arranged in a column of the liquid crystal element array LCD so as to be parallel to the signal lines.

Each liquid crystal display element (pixel) SPix arranged at an intersection of a row and a column of the liquid crystal element array LCD includes a thin film transistor Tr formed on the TFT glass substrate 300 and a liquid crystal element LC whose one terminal is connected to the source of the thin film transistor Tr. In the liquid crystal element array LCD, gates of the thin film transistors Tr of the plurality of liquid crystal display elements SPix arranged in the same row are connected to the scanning line arranged in the same row, and drains of the thin film transistors Tr of the plurality of liquid crystal display elements SPix arranged in the same column are connected to the signal line arranged in the same column. In other words, the plurality of liquid crystal display elements SPix are arranged in a matrix form, a scanning line is arranged in each row, and the plurality of liquid crystal display elements SPix arranged in the corresponding row are connected to the scanning line. Also, a signal line is arranged in each column and the liquid crystal display elements SPix arranged in the corresponding column are connected to the signal line. Further, the other ends of the liquid crystal elements LC of the plurality of liquid crystal display elements SPix arranged in the same column are connected to the common electrode arranged in the column.

When described with respect to the example shown in FIG. 6, the gate of the thin film transistor Tr of each of the plurality of liquid crystal display elements SPix arranged in the uppermost row in FIG. 6 is connected to the scanning line GL(0) arranged in the uppermost row. Further, the drain of the thin film transistor Tr of each of the plurality of liquid crystal display elements SPix arranged in the leftmost column in FIG. 6 is connected to the signal line SL(0)0(R) arranged in the leftmost column. Also, the other end of the liquid crystal element of each of the plurality of liquid crystal display elements SPix arranged in the leftmost column is connected to the common electrode TL(0) arranged in the leftmost column in FIG. 6. As already described above, one common electrode corresponds to a plurality of signal lines. Thus, in the example shown in FIG. 6, the common electrode TL(0) can be regarded as a common electrode shared by three columns.

One liquid crystal display element SPix corresponds to one sub-pixel described above. Thus, sub-pixels of three primary colors of R, G and B are formed of three liquid crystal display elements SPix. In FIG. 6, one pixel Pix is formed of three liquid crystal display elements SPix arranged consecutively in the same row and colors are expressed by the pixel Pix. Namely, in FIG. 6, the liquid crystal display element SPix shown as 600R serves as a sub-pixel SPix(R) of R (red), the liquid crystal display element SPix shown as 600G serves as a sub-pixel SPix(G) of G (green), and the liquid crystal display element SPix shown as 600B serves as a sub-pixel SPix(B) of B (blue). Thus, the sub-pixel SPix(R) shown as 600R is provided with a red color filter CR as a color filter, the sub-pixel SPix(G) shown as 600G is provided with a green color filter CG as a color filter, and the sub-pixel SPix(B) shown as 600B is provided with a blue color filter CB as a color filter.

Among the signals representing one pixel, an image signal corresponding to R is supplied to the signal line SL(0)0(R) from the signal line selector 6, an image signal corresponding to G is supplied to the signal line SL(0)0(G) from the signal line selector 6, and an image signal corresponding to B is supplied to the signal line SL(0)0(B) from the signal line selector 6.

Though not particularly limited, the thin film transistor Tr in each liquid crystal display element SPix is an N-channel MOSFET. The scanning signals Vs0 to Vsp (FIG. 1) in a pulse shape which become higher in level sequentially in this order are supplied to the scanning lines GL(0) to GL(p) from the gate driver 8. Namely, in the liquid crystal element array LCD, the voltage of scanning lines becomes higher in level sequentially from the scanning line GL(0) arranged in the upper row toward the scanning line GL(p) arranged in the lower row. Accordingly, in the liquid crystal element array LCD, the thin film transistors Tr in the liquid crystal display elements SPix are sequentially brought into conduction from the liquid crystal display element SPix arranged in the upper row toward the liquid crystal display element SPix arranged in the lower row.

When the thin film transistor Tr is brought into conduction, the pixel signal being supplied to the signal line at that time is supplied to the liquid crystal element LC via the thin film transistor in conduction. The electric field of the liquid crystal element LC changes in accordance with the value of the pixel signal supplied to the liquid crystal element LC, and the modulation of light passing through the liquid crystal element LC changes. Accordingly, a color image in accordance with the image signal supplied to the signal lines SL(0)0(R), SL(0)0(G) and SL(0)0(B) to SL(p)p(R), SL(p)p(G) and SL(p)p(B) is displayed on the liquid crystal panel 2 in synchronization with the scanning signals Vs0 to Vsp supplied to the scanning lines GL(0) to GL(p).

Here, the correspondence between the arrangement of the module 500 shown in FIG. 5 and the circuit diagram shown in FIG. 6 will be described below.

The liquid crystal element array (pixel array) LCD has a pair of sides substantially parallel to the row of the array and a pair of sides substantially parallel to the column of the array. The pair of sides parallel to the row of the liquid crystal element array LCD corresponds to the short sides 2-U (first side) and 2-D (second side) of the liquid crystal panel 2 shown in FIG. 5 and the pair of sides parallel to the column of the liquid crystal element array LCD corresponds to the long sides 2-L and 2-R of the liquid crystal panel 2.

In the liquid crystal element array LCD, as shown in FIGS. 3A, 4C and 5, the signal line selector 6, the semiconductor device for driver DDIC and the second circuit CGW2 are arranged along one side of the pair of sides parallel to the row, that is, one short side 2-D (second side) of the liquid crystal panel. In the liquid crystal element array LCD, the image signal from the signal line driver 11 in the semiconductor device for driver DDIC is supplied to the signal lines SL(0)0(R), SL(0)0(G) and SL(0)0(B) to SL(p)p(R), SL(p)p(G) and SL(p)p(B) via the signal line selector 6 on this one side (short side 2-D of the liquid crystal panel 2). Also, the selection signals TP(0) to TP(p) from the second circuit CGW2 arranged along the one side (short side 501-D of the liquid crystal panel 2) are supplied to the first circuit (first drive electrode circuit) CGW1 via the signal lines SL(0) to SL(p). The first circuit (first drive electrode circuit) CGW1 is arranged along the other side (short side 2-U (first side) of the liquid crystal panel 2) parallel to the row of the liquid crystal element array (pixel array) LCD and supplied to one ends of the common electrodes TL(0) to TL(p).

In the liquid crystal element array LCD, the gate drivers 8 are arranged along a pair of sides parallel to the column, that is, a pair of the long sides 2-L and 2-R of the liquid crystal panel 2. In the liquid crystal element array (pixel array) LCD, the scanning signals Vs0 to Vsp from the gate driver 8 are supplied to the scanning lines GL(0) to GL(p) on the pair of sides (2-L and 2-R).

Since the liquid crystal display device 1 according to the first embodiment is of an in-cell type, the common electrode TL is one electrode of the liquid crystal display element SPix, and a predetermined voltage is supplied thereto in the display period and a drive signal is supplied thereto from the first circuit (first drive electrode circuit) CGW1 in the touch detection period. If the drain of the thin film transistor Tr is viewed as the other electrode of the liquid crystal display element SPix, the other electrode of the liquid crystal display element SPix is a signal line in the display period and an image signal is supplied thereto. Further, in the first embodiment, some signal lines of the signal lines SL(0) to SL(p) are used as the control lines SS(0) to SS(p) to transmit the selection signals TP(0) to TP(p) from the second circuit CGW2 to the first circuit (first drive electrode circuit) CGW1 in the touch detection period.

The case in which the number of sub-pixels constituting one pixel is three has been described, but the present embodiment is not limited to this. For example, one pixel may be formed from sub-pixels including one or more colors of white (W), yellow (Y) and complementary colors of RGB (cyan (C), magenta (M) and yellow (Y)) in addition to RGB described above.

<Configuration of Liquid Crystal Display Device 1>

Figure 7:
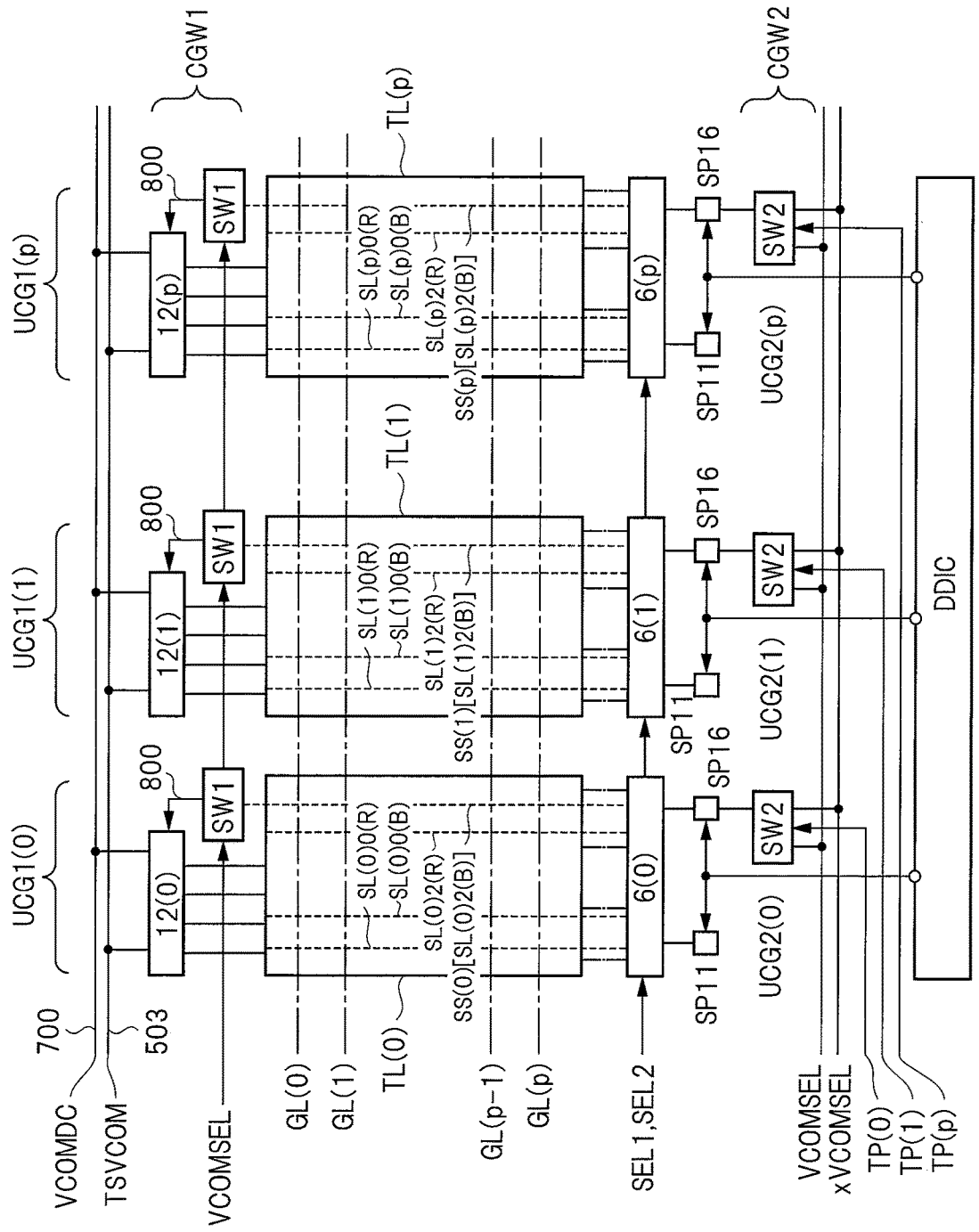
FIG. 7 is a block diagram showing the configuration of the liquid crystal display device with a touch detection function according to the first embodiment.

FIG. 7 is a block diagram showing the configuration of the liquid crystal display device 1 according to the first embodiment. FIG. 7 shows the common electrodes, the first circuit CGW1, the second circuit CGW2 and the semiconductor device for driver DDIC of the module 500 shown in FIG. 5 in detail. Though schematically, FIG. 7 is depicted in conformity to an actual arrangement.

In FIG. 7, TL(0) to TL(p) denote common electrodes and the common electrodes TL(0), TL(1) and TL(p) are shown as representative examples. Further, in FIG. 7, broken lines depicted on the common electrodes TL(0), TL(1) and TL(p) indicate signal lines and one-dot chain lines indicate the scanning lines GL(0) to GL(p).

In FIG. 7, each of SP11 to SP16 denotes a terminal formed on the TFT substrate 300 and the terminals SP11 to SP16 constitute a terminal group (SP11 to SP16) corresponding to one common electrode. Since the three common electrodes TL(0), TL(1) and TL(p) are shown in FIG. 7, three sets of terminal groups (SP11 to SP16) are shown. The terminals SP11 to SP16 are connected to terminals indicated by circle marks o of the semiconductor device for driver DDIC and image signals are supplied from the terminals (o marks) of the semiconductor device for driver DDIC in the display period. In the touch detection period, the semiconductor device for driver DDIC puts the terminals of circle marks o into a high-impedance state.

The signal line selector 6 (FIG. 1) is constituted of a plurality of unit signal line selectors 6(0) to 6(p). Each of the unit signal line selectors 6(0) to 6(p) has the same configuration and each unit signal line selector connects the terminals SP11 to SP16 to signal lines arranged on the common electrodes corresponding to the terminals SP11 to SP16 in accordance with the voltages of the selection signals SEL1 and SEL2. In FIG. 7, when described with respect to the unit signal line selector 6(0) depicted on the leftmost side, the unit signal line selector 6(0) connects the terminal SP11 to the signal line SL(0)0(R) or SL(0)0(B) in accordance with the voltages of the selection signals SEL1 and SEL2. For example, if the voltage of the selection signal SEL1 or SEL2 is at a high level, the unit signal line selector 6(0) connects the terminal SP11 to the signal line SL(0)0(R) or SL(0)0(B).

Accordingly, by selectively setting the selection signals SELL and SEL2 to the high level in the display period, an image signal supplied from the semiconductor device for driver DDIC to the terminal SP11 can be supplied to the signal line SL(0)0(R) or SL(0)0(B). The same is true of the remaining terminals SP12 to SP16. In the display period, the semiconductor device for driver DDIC supplies an image signal to each of the terminals SP11 to SP16 in a time-sharing manner and selectively sets the voltage of the selection signals SELL and SEL2 to the high level, thereby supplying the image signal to an appropriate signal line.

Meanwhile, in the touch detection period, the semiconductor device for driver DDIC sets each of the selection signals SELL and SEL2 to the high level. Accordingly, the unit signal line selector 6(0) connects the terminal SP11 to the signal lines SL(0)0(R) and SL(0)0(B). For each of the remaining terminals SP12 to SP16, the unit signal line selector 6(0) similarly connects two signal lines to one terminal.

The unit signal line selector 6(0) has been taken as an example in the description above, but the same is true of the remaining unit signal line selectors 6(1) to 6(p).

In the first embodiment, the second circuit CGW2 is made up of a plurality of unit selection circuits UCG2(0) to UCG2(p) and the first circuit (first drive electrode circuit) CGW1 is made up of a plurality of unit drive electrode circuits UCG1(0) to UCG1(p). Each of the plurality of unit selection circuits UCG2(0) to UCG2(p) has the same configuration and each of the plurality of unit drive electrode circuits UCG1(0) to UCG1(p) also has the same configuration. Each of the unit selection circuits UCG2(0) to UCG2(p) and the unit drive electrode circuits UCG1(0) to UCG1(p) corresponds to the common electrodes TL(0) to TL(p) in a one-to-one manner. When described with respect to the unit selection circuits UCG2(0), UCG2(1) and UCG2(p) and the unit drive electrode circuits UCG1(0), UCG1(1) and UCG1(p) shown in FIG. 7, the unit selection circuit UCG2(0) and the unit drive electrode circuit UCG1(0) correspond to the common electrode TL(0). Similarly, the unit selection circuit UCG2(1) and the unit drive electrode circuit UCG1(1) correspond to the common electrode TL(1) and the unit selection circuit UCG2(p) and the unit drive electrode circuit UCG1(p) correspond to the common electrode TL(p).

Next, the unit selection circuit UCG2(0) and the corresponding unit drive electrode circuit UCG1(0) are taken as an example to describe the relationship to the corresponding common electrode TL(0). The unit selection circuit UCG2(0) includes the switch circuit SW2. The control signals VCOMSEL and xVCOMSEL and the selection signal TP(0) corresponding to the common electrode TL(0) are supplied to the switch circuit SW2. The switch circuit SW2 is brought into conduction (ON state) by the control signals VCOMSEL and xVCOMSEL in the touch detection period and transmits the selection signal TP(0) to the terminal SP16. Accordingly, the selection signal TP(0) is transmitted to the control line SS(0). In the first embodiment, the control line SS(0) is the signal line SL(0)2(B), and an image signal representing blue (B) is supplied thereto from the semiconductor device for driver DDIC via the unit signal line selector 6(0) in the display period. In FIG. 7, the signal line SL(0)2(B) is denoted as SS(0)[SL(0)2(B)] in order to indicate that it is used also as the control line SS(0) in a time-sharing manner.

The unit drive electrode circuit UCG1(0) corresponding to the common electrode TL(0) includes the switch circuit SW1 and a unit drive electrode driver 12(0). The switch circuit SW1 is connected between the control line SS(0) and the unit drive electrode driver 12(0) and is controlled by the control signal VCOMSEL. The switch circuit SW1 electrically connects the control line SS(0) and the unit drive electrode driver 12(0) in the touch detection period and electrically separates the control line SS(0)[SL(0)2(B)] in the display period. In other words, the switch circuit SW1 is a separation circuit that electrically separates the control line SS(0)[SL(0)2(B)] and the unit drive electrode driver 12(0) in the display period.

In the first embodiment, an image signal from the semiconductor device for driver DDIC is supplied to the terminals SP11 to SP16 and then supplied to the signal line SL(0) via the unit signal line selector 6(0) in the display period. In the example of FIG. 7, the image signal is supplied to the signal lines SL(0)0(R), SL(0)0(B), SL(0)2(R) and SL(2)2(B) and an image is displayed in accordance with the image signal.

Meanwhile, in the touch detection period, the semiconductor device for driver DDIC puts the output terminal (o mark) thereof into a high-impedance state. At this time, the switch circuit SW2 constituting the unit selection circuit UCG2(0) is brought into conduction by the control signals VCOMSEL and xVCOMSEL, and the selection signal TP(0) output from the semiconductor device for touch 7 is transmitted to the control line SS(0)[SL(0)2(B)] via the switch circuit SW2 and then supplied to the unit drive electrode circuit UCG1(0) via the control line SS(0). In the unit drive electrode circuit UCG1(0), the switch circuit SW1 is brought into conduction by the control signal VCOMSEL in the touch detection period and supplies the supplied selection signal TP(0) to the unit drive electrode driver 12(0). The unit drive electrode driver 12(0) connects the drive electrode TL(0) to the signal wire 503 or a voltage wire 700 depending on whether or not the supplied selection signal TP(0) specifies the common electrode as a selected common electrode. Here, the control signal TSVCOM as a common drive signal is supplied to the signal wire 503 and a voltage VCOMDC corresponding to the ground voltage is supplied to the voltage wire 700.

When the selection signal TP(0) specifies the corresponding common electrode TL(0) as a selected common electrode, the unit drive electrode driver 12(0) connects the signal wire 503 to the common electrode TL(0). Meanwhile, when the selection signal TP(0) specifies the corresponding common electrode TL(0) as a non-selected common electrode, the unit drive electrode driver 12(0) connects the voltage wire 700 to the common electrode TL(0). Accordingly, when the common electrode TL(0) is specified as a selected common electrode in the touch detection period, the control signal TSVCOM whose voltage changes periodically is supplied as the drive signal Tx(0). As a result, whether or not the neighborhood of the common electrode TL(0) is touched can be detected. Meanwhile, when the common electrode TL(0) is specified as a non-selected common electrode in the touch detection period, the voltage VCOMDC as a ground voltage is supplied to the common electrode TL(0).

The switch circuit SW2 constituting the unit selection circuit UCG2(0) is put into a high-impedance state in the display period. Further, in the display period, the switch circuit SW1 operates as a separation circuit. Accordingly, an image signal supplied to the terminal SP16 can be transmitted to the signal line SL(0)2(B) and the image signal can be supplied to a pixel connected to the signal line SL(0)2(B).

The other unit selection circuits UCG2(1) to UCG2(p) and unit drive electrode circuits UCG1(1) to UCG(p) operate in the same manner as the above-described unit selection circuit UCG2(0) and unit drive electrode circuit UCG1(0). In the example of FIG. 7, among the signal lines corresponding to the common electrode TL(1), the signal line SL(1)2(B) is used as the control line SS(1) in the touch detection period. Also, among the signal lines corresponding to the common electrode TL(p), the signal line SL(p)2(B) is used as the control line SS(p) in the touch detection period.

In the first embodiment, the drive electrode driver 12 shown in FIG. 1 can be regarded as being constituted of the unit drive electrode drivers 12(0) to 12(p).

<Configuration of Unit Selection Circuit and Unit Drive Electrode Circuit>

Next, the configuration of the unit selection circuits UCG2(0) to UCG2(p) and the unit drive electrode circuits UCG1(0) to UCG1(p) shown in FIG. 7 will be described. Here, the unit selection circuit UCG2(0) and the unit drive electrode circuit UCG1(0) will be described as an representative example.

Figure 8:
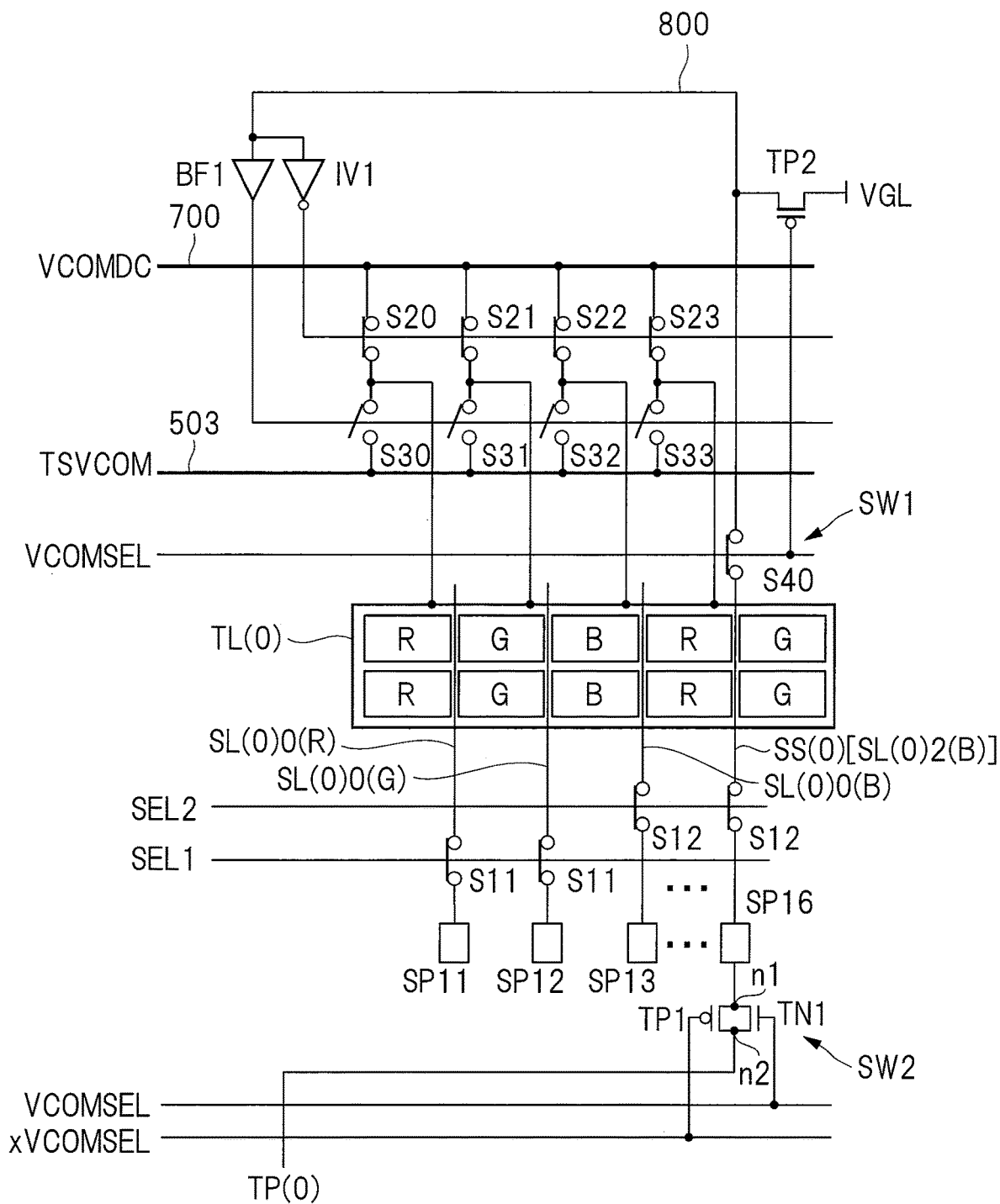
FIG. 8 is a circuit diagram showing the configuration of the liquid crystal display device with a touch detection function according to the first embodiment.

FIG. 8 is a circuit diagram showing principal parts in the configuration of the liquid crystal display device 1 according to the first embodiment. FIG. 8 shows the configuration of the unit selection circuit UCG2(0) and the unit drive electrode circuit UCG1(0), the common electrode TL(0) and pixels for two rows. In in order to prevent the drawing from being complicated, only the terminals SP11 to SP13 and SP16 of the terminals SP11 to SP16 are shown in FIG. 8. Also, among a plurality of signal lines, only the signal lines SL(0)0(R), SL(0)0(G) and SL(0)0(B) and the signal line SL(0)2(B) are shown. Here, since the signal line SL(0)2(B) functions as the control line SS(0) in the touch detection period, it is denoted as SS(0)[SL(0)2(B)]. Note that R, G and B in FIG. 8 represent pixels.

Further, FIG. 8 shows a state of the unit signal line selector 6(0) in the touch detection period. Namely, the state in which the unit signal line selector 6(0) connects each of the terminals SP11 to SP13 and SP16 and the signal line SL(0) based on the selection signals SEL1 and SEL2 is shown.

The unit signal line selector 6(0) includes a plurality of switches S11 whose ON/OFF is controlled by the selection signal SEL1 and a plurality of switches S12 whose ON/OFF is controlled by the selection signal SEL2. In the display period, the selection signals SEL1 and SEL2 are complementarily set to the high level, so that the switch S11 and the switch S12 are complementarily turned on. Accordingly, an image signal supplied to each of the terminals SP11 to SP16 is supplied to an appropriate signal line. Meanwhile, in the touch detection period, though not particularly limited, both of the selection signals SEL1 and SEL2 are set to the high level. Accordingly, as shown in FIG. 8, the terminals SP11 to SP16 are connected to a plurality of signal lines corresponding to the common electrode TL(0).

The switch circuit SW2 constituting the unit selection circuit UCG2(0) includes a P-channel type MOSFET (hereinafter, referred to as P-type MOSFET) TP1 and an N-channel type MOSFET (hereinafter, referred to as N-type MOSFET) TN1. One electrode (source or drain) of the P-type MOSFET TP1 is connected to the terminal SP16 via a node n1 and one electrode (drain or source) of the N-type MOSFET TN1 is also connected to the terminal SP16 via the node n1. The other electrode (drain or source) of the P-type MOSFET TP1 and the other electrode (source or drain) of the N-type MOSFET TN1 are connected to a node n2 in common and the selection signal TP(0) from the semiconductor device for touch 7 is supplied to the node n2. The control signal xVCOMSEL is supplied to the gate of the P-type MOSFET TP1 and the control signal VCOMSEL is supplied to the gate of the N-type MOSFET TN1.

The semiconductor device for touch 7 sets the control signal VCOMSEL to the high level and sets the control signal xVCOMSEL to the low level in the touch detection period. Also, the semiconductor device for touch 7 sets the selection signal corresponding to the common electrode to be specified as a selected common electrode to the high level and sets the selection signal corresponding to the common electrode to be specified as a non-selected common electrode to the low level. For example, when the common electrode TL(0) is specified as a selected common electrode, the semiconductor device for touch 7 sets the selection signal TP(0) corresponding to the common electrode TL(0) to the high level, and when the common electrode TL(0) is specified as a non-selected common electrode, the semiconductor device for touch 7 sets the selection signal TP(0) to the low level.

Accordingly, each of the P-type MOSFET TP1 and the N-type MOSFET TN1 constituting the switch circuit SW2 is turned on in the touch detection period and supplies the selection signal TP(0) supplied to the node n2 to the terminal SP16 via the node n1. Meanwhile, in the display period, the control signal VCOMSEL is set to the low level and the control signal xVCOMSEL is set to the high level. Accordingly, each of the P-type MOSFET TP1 and the N-type MOSFET TN1 is turned off. As a result, the node n1 serving as an output terminal of the switch circuit SW2 is put into a high-impedance state.

In the touch detection period, the selection signal TP(0) supplied to the terminal SP16 propagates through the control line SS(0) and is supplied to the unit drive electrode circuit UCG1(0). Namely, the selection signal TP(0) is supplied to the switch circuit SW1 in the unit drive electrode circuit UCG1(0). The switch circuit SW1 includes a switch S40 connected between the control line SS(0) and a signal wire 800. The switch S40 is controlled by the control signal VCOMSEL. Since the control signal VCOMSEL is set to the high level in the touch detection period as described above, the switch circuit SW1 is turned on in the touch detection period and turned off in the display period.

The unit drive electrode driver 12(0) constituting the unit drive electrode circuit UCG1(0) includes a P-type MOSFET TP2, a buffer circuit BF1, an inverter circuit IV1, switches S20 to S23 and switches S30 to S33. Each of the switches S20 to S23 is connected in parallel between the voltage wire 700 and the common electrode TL(0) and each of the switches S30 to S33 is connected in parallel between the signal wire 503 and the common electrode TL(0). ON/OFF of each of the switches S20 to S23 is controlled by an output signal of the inverter circuit IV1 and ON/OFF of each of the switches S30 to S33 is controlled by an output signal of the buffer circuit BF1. The input of the inverter circuit IV1 and the input of the buffer circuit BF1 are connected to the signal wire 800. The signal wire 800 is connected to the drain of the P-type MOSFET TP2. The source of the P-type MOSFET TP2 is connected to a voltage VGL corresponding to the ground voltage, and the control signal VCOMSEL is supplied to the gate thereof.

The control signal VCOMSEL is set to the high level in the touch detection period and thus the P-type MOSFET TP2 is turned off. Accordingly, the voltage of the signal wire 800 becomes the same voltage as that of the selection signal TP(0) supplied via the switch circuit SW1. When the common electrode TL(0) is specified as a selected common electrode, the selection signal TP(0) is set to the high level, so that the buffer circuit BF1 outputs a high level and the inverter circuit IV1 outputs a low level. Accordingly, each of the switches S30 to S33 is turned on and the common electrode TL(0) is connected to the signal wire 503 via the switches S30 to S33. The control signal TSVCOM supplied to the signal wire 503 is a clock signal whose voltage changes periodically in the touch detection period. Thus, when the common electrode TL(0) is specified as a selected common electrode, a drive signal whose voltage changes periodically is supplied, and whether or not the neighborhood of the common electrode TL(0) is touched can be detected.

Meanwhile, when the common electrode TL(0) is specified as a non-selected common electrode, the selection signal TP(0) is set to the low level. The low level of the selection signal TP(0) is transmitted through the signal wire 800 and is supplied to the buffer circuit BF1 and the inverter circuit IV1. Accordingly, the buffer circuit BF1 outputs a low level and the inverter circuit IV1 outputs a high level. Since the output of the inverter circuit IV1 is set to the high level, each of the switches S20 to S23 is turned on. On the other hand, since the output of the buffer circuit BF1 is set to the low level, each of the switches S30 to S33 is turned off. As a result, the common electrode TL(0) is connected to the voltage wire 700 via the switches S20 to S23 and the ground voltage is supplied thereto. When the common electrode TL(0) is specified as a non-selected common electrode, since the voltage of the common electrode TL(0) is fixed to the ground voltage, the touch is not detected even if the neighborhood of the common electrode TL(0) is touched.

Since the control signal VCOMSEL is set to the low level in the display period, the switch circuit SW1 is turned off. As a result, the signal wire 800 and the signal line SL(0)2(B) are electrically separated, and the supply of an image signal to the unit drive electrode driver 12(0) can be prevented. At this time, since the P-type MOSFET TP2 is turned on, the voltage VGL is supplied to the signal wire 800 via the P-type MOSFET TP2. As a result, the output of the buffer circuit BFI is set to the low level and the output of the inverter circuit IV1 is set to the high level. Since the output of the inverter circuit IV1 is set to the high level, each of the switches S20 to S23 is turned on. Accordingly, the voltage VCOMDC is supplied to the common electrode TL(p) via the switches S20 to S23 in the display period. In this case, the voltage VCOMDC is the voltage VCOMDC corresponding to the ground voltage. In this manner, the voltage VCOMDC suitable for display can be supplied to the common electrode TL(0) in the display period.

<Operation of Unit Selection Circuit and Unit Drive Electrode Circuit>

Figure 9:
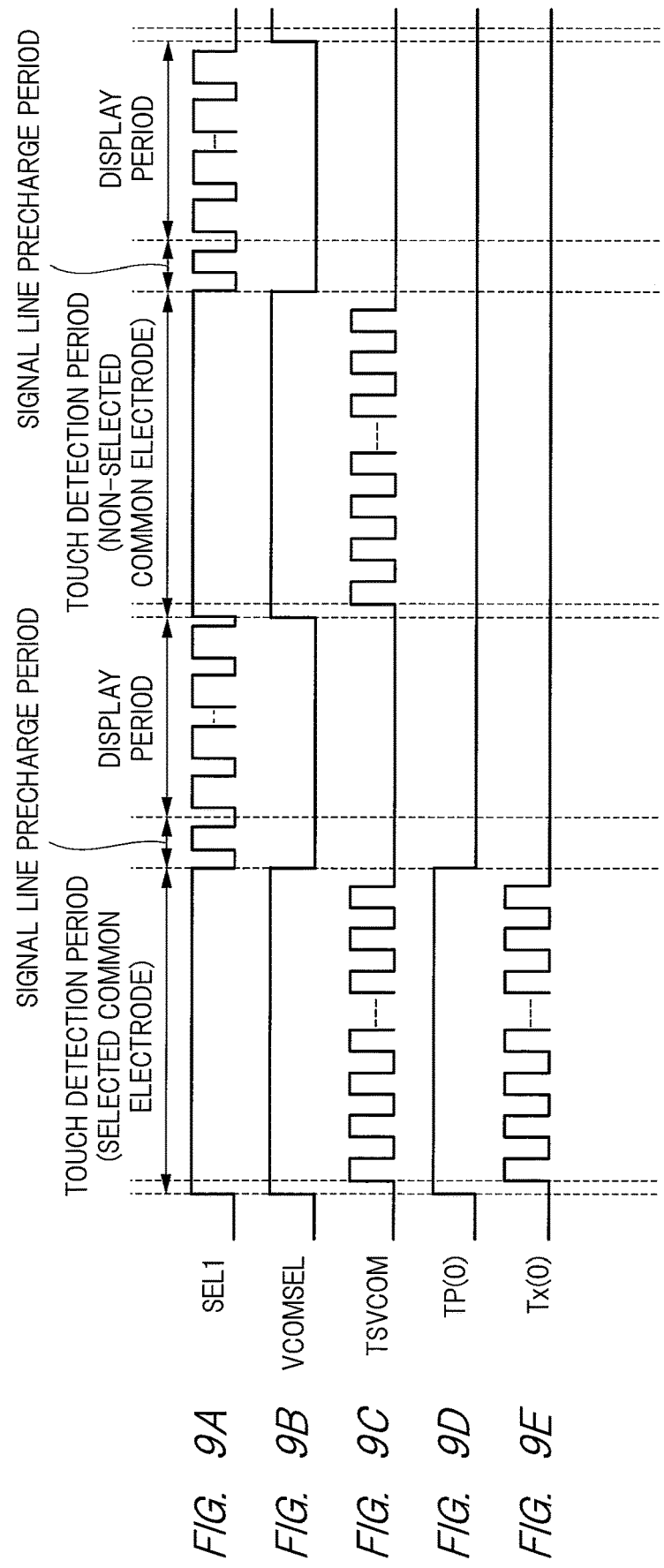
FIG. 9A to FIG. 9E are waveform charts showing an operation of the liquid crystal display device with a touch detection function according to the first embodiment.

Next, the operation of the liquid crystal display device 1 shown in FIG. 8 will be described. FIG. 9A to FIG. 9E are waveform charts showing the operation of the liquid crystal display device 1 shown in FIG. 8. In FIG. 9, the horizontal axis represents the time and the vertical axis represents the voltage. FIG. 9A shows a waveform of the selection signal SEL1, FIG. 9B shows a waveform of the control signal VCOMSEL, and FIG. 9C shows a waveform of the control signal TSVCOM.

In FIG. 9, waveforms in the touch detection period and the display period are shown, and waveforms concerning the common electrode TL(0) shown in FIG. 8 are shown for the touch detection period. Namely, FIG. 9D shows a waveform of the selection signal TP(0) and FIG. 9E shows a waveform of the drive signal Tx(0) supplied to the common electrode TL(0). In FIG. 9, "touch detection period (selected common electrode)" indicates the case where the common electrode TL(0) is specified as a selected common electrode by the semiconductor device for touch 7. Also, "touch detection period (non-selected common electrode)" indicates the case where the common electrode TL(0) is specified as a non-selected common electrode by the semiconductor device for touch 7.

As shown in FIG. 9, the touch detection period and the display period appear alternately, and though not particularly limited, a signal line precharge period is provided before the transition from the touch detection period to the display period. In the signal line precharge period, the signal lines SL(0) to SL(p) are precharged to set the voltage of each signal line to a predetermined voltage. Accordingly, the occurrence of an undesired display can be suppressed in the transition to the display period.

In the display period, the semiconductor device for touch 7 sets the control signal VCOMSEL to the low level and sets the control signal TSVCOM to the low level. In addition, the semiconductor device for touch 7 complementarily sets the selection signals SEL1 and SEL2 to the high level. Though FIG. 9A shows only the waveform of the selection signal SEL1, it should be understood that the selection signal SEL2 is at a high level when the selection signal SEL1 is at a low level. Accordingly, the switches S11 and S12 shown in FIG. 8 are alternately turned on and image signals supplied to the terminals SP11 to SP16 are supplied to appropriate signal lines in a time-sharing manner.

Further, in the display period, the control signal VCOMSEL is set to a low level, and thus the P-type MOSFET TP2 shown in FIG. 8 is turned on and the switch circuit SW1 is brought out of conduction. Accordingly, the signal wire 800 is separated from the signal line SL(0)2(B) and has a low-level voltage VGL. Since the low-level voltage VGL is supplied to the inverter circuit IV1, the switches S20 to S23 are turned on and the voltage VCOMDC corresponding to the ground voltage is supplied to the common electrode TL(0) as a drive voltage for display via the switches S20 to S23.

Further, since the control signal xVCOMSEL is a signal obtained by inverting the phase of the control signal VCOMSEL, it is at a high level in the display period. Accordingly, both of the P-type MOSFET TP1 and the N-type MOSFET TN1 constituting the switch circuit SW2 shown in FIG. 8 are turned off and the output node n1 of the switch circuit SW2 is put into a high-impedance state. Accordingly, an image signal supplied from the semiconductor device for driver DDIC to the terminals SP11 to SP16 is transmitted to the signal lines SL(0)0(R), SL(0)0(G) and SL(0)0(B) to SL(0)2(R), SL(0)2(G) and SL(0)2(B), and the display in accordance with the image signal is made.

In the touch detection period, the semiconductor device for driver DDIC sets both of the selection signals SEL1 and SEL2 to the high level. Accordingly, both of the switches S11 and S12 shown in FIG. 8 are turned on. Also, the semiconductor device for touch 7 sets the control signal VCOMSEL to the high level and changes the voltage of the control signal TSVCOM periodically.

When the touch detection period is the touch detection period (selected common electrode), the semiconductor device for touch 7 sets the selection signal TP(0) to the high level. Since the control signal VCOMSEL is at a high level and the control signal xVCOMSEL is at a low level, the switch circuit SW2 is brought into conduction and the selection signal TP(0) at a high level is supplied to the terminal SP16 via the switch circuit SW2. At this time, the output terminal (○ mark in FIG. 7) of the semiconductor device for driver DDIC is in a high-impedance state, and thus the selection signal TP(0) supplied to the terminal SP16 propagates through the control line SS(0) and is supplied to the unit drive electrode circuit UCG1(0).

In the unit drive electrode circuit UCG1(0), the control signal VCOMSEL is at a high level, and thus the switch circuit SW1 is brought into conduction and the P-type MOSFET TP2 is turned off. Therefore, the control line SS(0) is connected to the signal wire 800 via the switch circuit SW1 and the voltage of the signal wire 800 is set to the high level. Since the voltage of the signal wire 800 is set to the high level, the output of the buffer circuit BF1 is set to the high level and the output of the inverter circuit IV1 is set to the low level. Accordingly, the switches S20 to S23 are turned off and the switches S30 to S33 are turned on. Since the switches S30 to S33 are turned on, the common electrode TL(0) is connected to the signal wire 503 via the switches S30 to S33. Since the voltage of the control signal TSVCOM in the signal wire 503 periodically changes, the drive signal Tx(0) whose voltage changes periodically as shown in FIG. 9E is supplied to the drive electrode TL(0). Accordingly, as described with reference to FIG. 2, whether or not the neighborhood of the drive electrode TL(0) is touched can be detected.

Meanwhile, when the touch detection period is the touch detection period (non-selected common electrode), the semiconductor device for touch 7 sets the selection signal TP(0) to the low level. Since the control signal VCOMSEL is at a high level and the control signal xVCOMSEL is at a low level, the switch circuit SW2 is brought into conduction and the selection signal TP(0) at a low level is supplied to the terminal SP16 via the switch circuit SW2. At this time, since the output terminal (○ mark in FIG. 7) of the semiconductor device for driver DDIC is in a high-impedance state, the selection signal TP(0) supplied to the terminal SP16 propagates through the control line SS(0) and is supplied to the unit drive electrode circuit UCG1(0).

In the unit drive electrode circuit UCG1, the control signal VCOMSEL is at a high level, and thus the switch circuit SW1 is brought into conduction and the P-type MOSFET TP2 is turned off. Therefore, the control line SS(0) is connected to the signal wire 800 via the switch circuit SW1 and the voltage of the signal wire 800 is set to the low level. Since the voltage of the signal wire 800 is set to the low level, the output of the buffer circuit BF1 is set to the low level and the output of the inverter circuit IV1 is set to the high level. Accordingly, the switches S30 to S33 are turned off and the switches S20 to S23 are turned on. Since the switches S20 to S23 are turned on, the common electrode TL(0) is connected to the voltage wire 700 via the switches S20 to S23. As a result, the control signal TSVCOM whose voltage changes periodically is not supplied to the common electrode TL(0) and the voltage VCOMDC corresponding to the ground voltage is supplied thereto. Accordingly, the voltage of a detection signal does not change even if the neighborhood of the common electrode TL(0) is touched, and the presence or absence of a touch is not detected.

Although the common electrode TL(0), the unit selection circuit UCG2(0) and the unit drive electrode circuit UCG1(0) have been described as a representative example, the configuration and operation are the same also in the common electrodes TL(1) to TL(p), the unit selection circuits UCG2(1) to UCG2(*p*) and the unit drive electrode circuits UCG1(1) to UCG1(*p*).

In the first embodiment, the second circuit CGW2 arranged along the short side 2-D of the liquid crystal panel 2 can be constituted of a smaller number of elements (P-type MOSFET TP1 and N-type MOSFET TN1), and thus the lower edge frame of the liquid crystal panel 2 can be made narrower. In addition, since the first circuit (first drive electrode circuit) CGW1 arranged along the short side 2-U of the liquid crystal panel 2 drives the common electrodes TL(0) to TL(p), a touch can be detected. Further, by using the signal line that transmits an image signal in the display period as the control line serving as the wire that transmits the selection signal from the second circuit CGW2 to the first circuit CGW1 in the touch detection period, the increase in size of the lateral edge frame of the display panel 2 can be suppressed.

In FIG. 7 and FIG. 8, an example in which the signal line SL(0)2(B) is used as the control line SS(0) is described, but the present embodiment is not limited to this. The plurality of signal lines serving as the signal line SL(0) corresponding to the common electrode TL(0), for example, all the signal lines SL(0)0(R), SL(0)0(G) and SL(0)0(B) to SL(0)2(R), SL(0)2(G) and SL(0)2(B) or at least some of these signal lines may be used as the control line SS(0). In this case, for example, a switch circuit corresponding to the switch circuit SW2 is provided for each of the terminals SP11 to SP16 to connect an output node n1 of each of the switch circuits to the terminals SP11 to SP16, and a switch circuit corresponding to the switch circuit SW1 is provided between each of the signal lines and the signal wire 800. With respect to each of the signal lines SL(1) to SL(p), not only one signal line, but also at least some of signal lines can be used as the control line like the signal line SL(0).

As described above, with respect to each of the signal lines SL(0) to SL(p) corresponding to a common electrode, the plurality of signal lines are used also as a control line, so that the delay time when the selection signals TP(0) to TP(p) propagate can be reduced.

Second Embodiment

<Configuration of Liquid Crystal Display Device 1>

Figure 10:
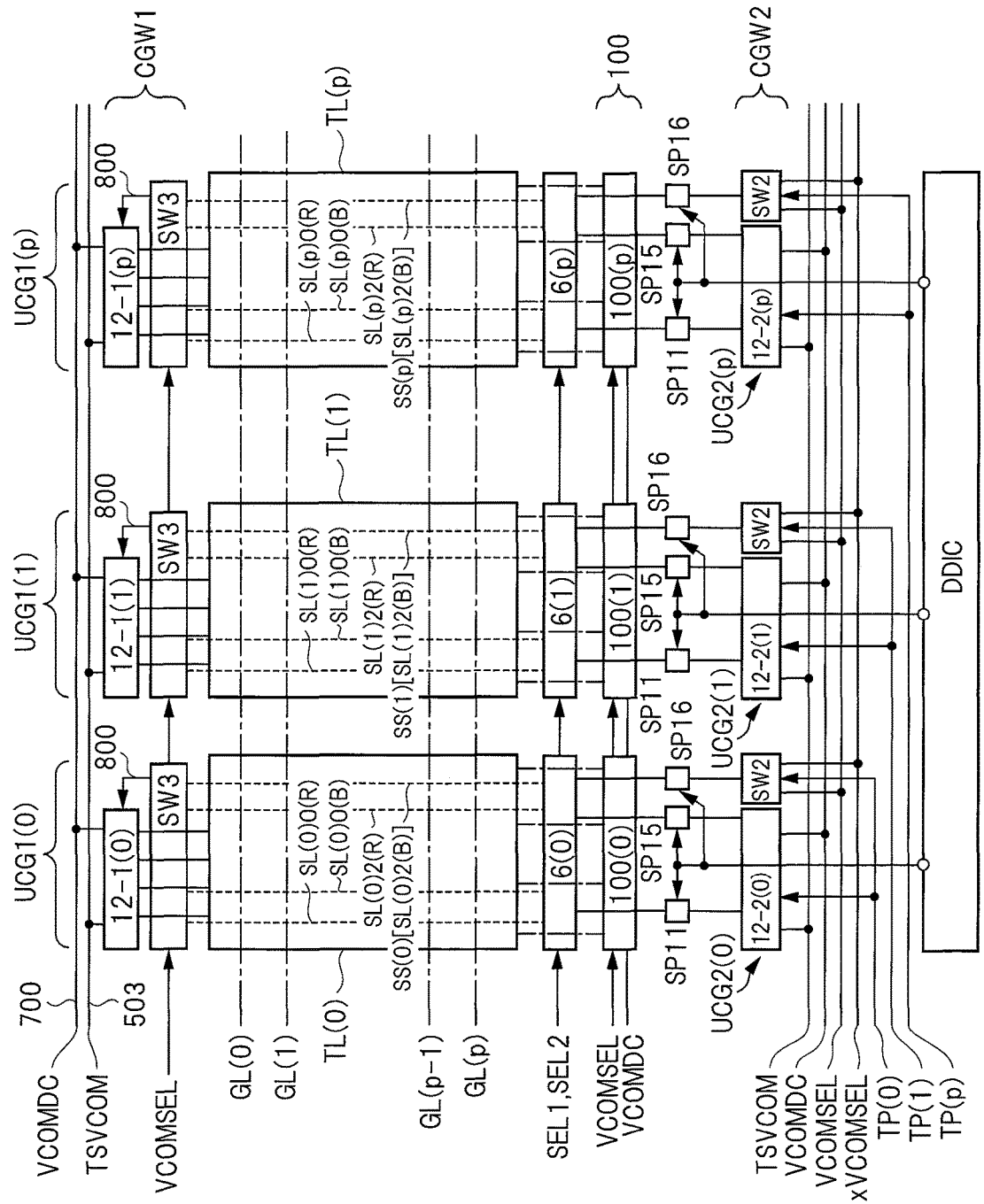
FIG. 10 is a block diagram showing the configuration of the liquid crystal display device with a touch detection function according to the second embodiment.

FIG. 10 is a block diagram showing the configuration of the liquid crystal display device 1 according to the second embodiment. FIG. 10 shows the common electrodes, the first circuit CGW1, the second circuit CGW2 and the semiconductor device for driver DDIC of the module 500 shown in FIG. 5 in detail. Though schematically, FIG. 10 is also depicted in conformity to an actual arrangement.

The configuration of the liquid crystal display device shown in FIG. 10 is similar to the configuration of the liquid crystal display device shown in FIG. 7. Here, differences from the liquid crystal display device shown in FIG. 7 will be mainly described. First, an overview of the differences will be described. In the liquid crystal display device 1 according to the second embodiment, the first circuit CGW1 includes a first drive electrode circuit like in the first embodiment and the second circuit CGW2 also includes a second drive electrode circuit that supplies the drive signals Tx(0) to Tx(p) to the common electrodes TL(0) to TL(p). In addition, the liquid crystal display device 1 according to the second embodiment includes a switching circuit 100 that connects the common electrodes TL(0) to TL(p) to the voltage VCOMDC in the display period and connects the common electrodes TL(0) to TL(p) to some of the terminals SP11 to SP16 in the touch detection period.

The first circuit CGW1 is, like in the first embodiment, a first drive electrode circuit and includes a plurality of first unit drive electrode circuits UCG1(0) to UCG1(p). These first unit drive electrode circuits UCG1(0) to UCG1(p) correspond to the common electrodes TL(0) to TL(p) in a one-to-one manner and have the same configuration. When described with using the first unit drive electrode circuit UCG1(0) as a representative example, the first unit drive electrode circuit UCG1(0) includes a first unit drive electrode driver 12-1(0) and a switch circuit SW3. The first unit drive electrode driver 12-1(0) has the same configuration as that of the unit drive electrode driver 12(0) described in the first embodiment.

The switch circuit SW3 is controlled by the control signal VCOMSEL and transmits the selection signal supplied via the control line SS(0) to the signal wire 800 in the touch detection period. Also, the switch circuit SW3 connects the signal lines other than the signal line corresponding to the control line SS(0) to the common electrode TL(0) in the touch detection period.

The second circuit CGW2 is a second drive electrode circuit and includes a plurality of second unit drive electrode circuits UCG2(0) to UCG2(p). These second unit drive electrode circuits UCG2(0) to UCG2(p) correspond to the common electrodes TL(0) to TL(p) in a one-to-one manner and have the same configuration. When described with using the second unit drive electrode circuit UCG2(0) as a representative example, the second unit drive electrode circuit UCG2(0) includes a second unit drive electrode driver 12-2(0) and the switch circuit SW2. The second unit drive electrode driver 12-2(0) is similar to the first unit drive electrode driver 12-1(0) and supplies the control signal TSVCOM whose voltage changes periodically to the predetermined terminals SP11 to SP15 of the terminals SP11 to SP16 when the selection signal TP(0) specifies the common electrode TL(0) as a selected common electrode in the touch detection period.

The switch circuit SW2 has the same configuration as that of the switch circuit SW2 described in the first embodiment and supplies the selection signal TP(0) to the control line SS(0) in the touch detection period.

The switching circuit 100 is also constituted of a plurality of unit switching circuits 100(0) to 100(p). The unit switching circuits 100(0) to 100(p) correspond to the common electrodes TL(0) to TL(p) in a one-to-one manner and have the same configuration. When described with using the unit switching circuit 100(0) as a representative example, the unit switching circuit 100(0) corresponds to the common electrode TL(0) and connects the corresponding common electrode TL(0) to the predetermined terminals SP11 to SP15 or the voltage VCOMDC in accordance with the control signal VCOMSEL. Namely, the unit switching circuit 100(0) connects the corresponding common electrode TL(0) to the voltage VCOMDC when the control signal VCOMSEL indicates a display period, and it connects the common electrode TL(0) to the terminals SP11 to SP15 when the control signal VCOMSEL indicates a touch detection period.

In the touch detection period, the common electrode TL(0) is connected to the terminals SP11 to SP15 by the unit switching circuit 100(0) and a drive signal from the second unit drive electrode driver 12-2(0) is supplied to the common electrode TL(0) via the terminals SP11 to SP15. At this time, the drive signal from the second unit drive electrode driver 12-2(0) is supplied also to signal lines other than the signal line SL(0)2(B) corresponding to the control line SS(0).

In the touch detection period, like in the first embodiment, the selection signal TP(0) is supplied to the control line SS(0)[SL(0)2(B)] via the switch circuit SW2. The selection signal TP(0) propagates through the control line SS(0)[SL (0)2(B)] and is supplied to the signal wire 800 via the switch circuit SW3. The first unit drive electrode driver 12-1(0) forms a drive signal in accordance with the voltage of the signal wire 800 and supplies the drive signal to the common electrode TL(0) like the drive electrode driver 12(0) in the first embodiment. At this time, the switch circuit SW3 connects the signal lines other than the signal line SL(0)2(B) corresponding to the control line SS(0) to the common electrode TL(0). Thus, the drive signal formed by the first unit drive electrode driver 12-1(0) is supplied also to the signal lines other than the signal line SL(0)2(B) corresponding to the control line SS(0).

Accordingly, in the touch detection period, drive signals are supplied from both ends of the common electrode TL(0) by the first unit drive electrode driver 12-1(0) and the second unit drive electrode driver 12-2(0) arranged along the short side 2-U (first side) and the short side 2-D (second side) of the liquid crystal panel 2. Also, the signal lines other than the control line SS(0)[SL(0)2(B)] are connected to the common electrode TL(0) in parallel by the switch circuit SW3 and the switching circuit 100(0), so that combined impedance can be reduced. As a result, the common electrode TL(0) can be driven even if driving ability of the first unit drive electrode driver 12-1(0) and the second unit drive electrode driver 12-2(0) are decreased, and the first and second unit drive electrode drivers 12-1(0) and 12-2(0) can be reduced in size. Accordingly, the upper and lower edge frames of the liquid crystal panel 2 can be made narrower.

In addition, since the wire functioning as the signal line SL(0)2(B) in the display period is used as a control line that transmits the selection signal TP(0) like in the first embodiment, it is possible to prevent the increase in size of the right and left edge frames of the liquid crystal panel 2.

The first unit drive electrode circuit UCG1(0), the second unit drive electrode circuit UCG2(0) and the unit switching circuit 100(0) have been described as a representative example, but the configuration and operation are the same also in the remaining first unit drive electrode circuits UCG1(1) to UCG1(*p*), second unit drive electrode circuits UCG2(1) to UCG2(*p*) and unit switching circuits 100(1) to 100(*p*).

<Configuration of First Unit Drive Electrode Circuit and Second Unit Drive Electrode Circuit>

Next, the configuration of the first unit drive electrode circuits UCG1(0) to UCG1(*p*) and the second unit drive electrode circuits UCG2(0) to UCG2(*p*) shown in FIG. 10 will be described. Here, the first unit drive electrode circuit UCG1(0) and the second unit drive electrode circuit UCG2(0) will be described as a representative example with reference to FIG. 11.

Figure 11:
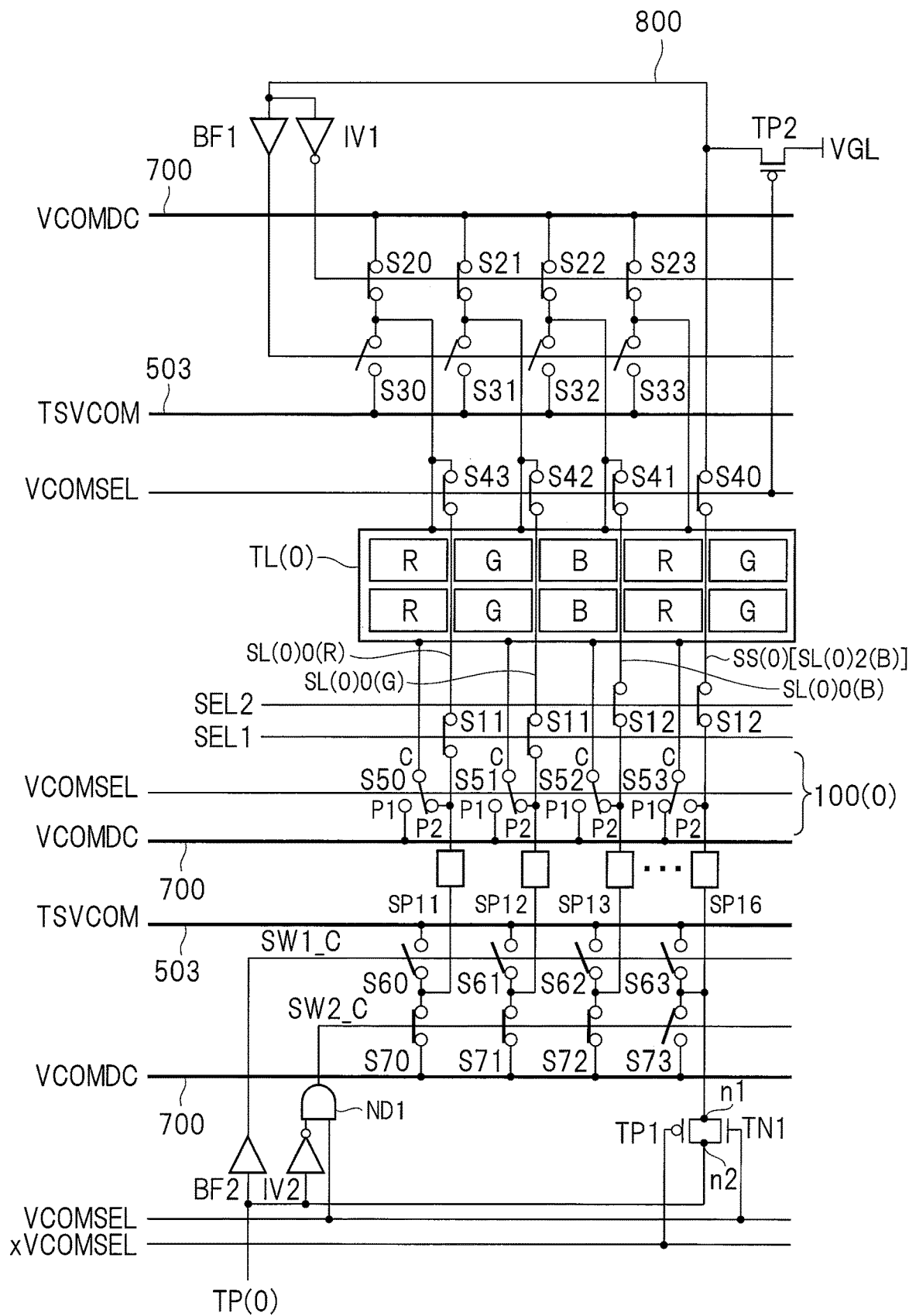
FIG. 11 is a circuit diagram showing the configuration of the liquid crystal display device with a touch detection function according to the second embodiment.

FIG. 11 is a circuit diagram showing the configuration of principal parts of the liquid crystal display device 1 according to the second embodiment. Since the circuit diagram shown in FIG. 11 is similar to the circuit diagram shown in FIG. 8, differences will be mainly described here.

The configuration of the first unit drive electrode driver 12-1(0) included in the first unit drive electrode circuit UCG1(0) is the same as that of the unit drive electrode driver 12(0) shown in FIG. 8. Namely, the first unit drive electrode driver 12-1(0) includes the P-type MOSFET TP2, the switches S20 to S23 and S30 to S33, the inverter circuit IV1 and the buffer circuit BF1.

The switch circuit SW3 includes switches S40 to S43 controlled by the control signal VCOMSEL. Here, the switch S40 is connected between the signal wire 800 and the signal line SL(0)2(B) like in FIG. 8. The signal line SL(0)2(B) is used to transmit an image signal in the display period and is used as the control line SS(0) that transmits a selection signal in the touch detection period like in the first embodiment. The switch S40 is turned off by the control signal VCOMSEL in the display period and so functions as a separation circuit that separates the signal wire 800 and the signal line SL(0)2(B).

The switches S41 to S43 are connected between the common electrode TL(0) and the signal lines other than the signal line SL(0)2(B). FIG. 10 shows the switches S41 to S43 connected between the common electrode TL(0) and the signal lines SL(0)0(R), SL(0)0(G) and SL(0)0(B). Each of the switches S41 to S43 is also turned on when the control signal VCOMSEL indicates the touch detection period, that is, when the control signal VCOMSEL is at a high level. On the other hand, when the control signal VCOMSEL indicates the display period, that is, when the control signal VCOMSEL is at a low level, each of the switches S41 to S43 is turned off.

In the touch detection period, like in the first embodiment, a selection signal is supplied to the signal wire 800 via the control line SS(0) and the switch S40. When the selection signal specifies the common electrode TL(0) as a selected common electrode, the selection signal is at a high level. Accordingly, like in the case described with reference to FIG. 8, the switches S30 to S33 in the first unit drive electrode driver 12-1(0) are turned on and the control signal TSVCOM is supplied to the common electrode TL(0) as the drive signal Tx(0). At this time, since the switches S41 to S43 in the switch circuit SW3 are also in an on state, the control signal TSVCOM is supplied also to each of the signal lines SL(0)0(R), SL(0)0(G) and SL(0)0(B) via the switches S41 to S43 as the drive signal Tx(0).

Note that no switch is provided between the signal line SL(0)2(B) used as the control line SS(0) and the common electrode TL(0). Since the signal line SL(0)2(B) is used as the control line SS(0) to transmit a selection signal in the touch detection period, no switch is provided so as to prevent the drive signal from being supplied.

Further, when the selection signal specifies the common electrode TL(0) as a non-selected common electrode in the touch detection period, the selection signal is set to the low level. Accordingly, like in the case described with reference to FIG. 8, the switches S20 to S23 in the first unit drive electrode driver 12-1(0) are turned on. Accordingly, the voltage VCOMDC corresponding to the ground voltage is supplied to the common electrode TL(0) and the signal lines SL(0)0(R), SL(0)0(G) and SL(0)0(B).

Since the control signal VCOMSEL is set to the low level in the display period, the switches S40 to S43 in the switch circuit SW3 are turned off. Accordingly, the signal line SL(0)2(B) is separated from the signal wire 800, and the switches S20 to S23 are turned on and a drive voltage for display is supplied from the first unit drive electrode circuit UCG1(0) to the common electrode TL(0) like in the case described with reference to FIG. 8.

The second unit drive electrode circuit UCG2(0) includes the second unit drive electrode driver 12-2(0) and the switch circuit SW2. The switch circuit SW2 has the same configuration as that of the switch circuit SW2 shown in FIG. 8. Namely, the switch circuit SW2 includes the N-type MOSFET TN1 controlled by the control signal VCOMSEL and the P-type MOSFET TP1 controlled by the control signal xVCOMSEL. The selection signal TP(0) from the semiconductor device for touch 7 is supplied to the input node n2 of the switch circuit SW2 and the output node n1 of the switch circuit SW2 is connected to the terminal SP16.

The second unit drive electrode driver 12-2(0) includes a first switch connected between each of the terminals SP11 to SP16 and the signal wire 503 and a second switch connected between each of the terminals SP11 to SP16 and the voltage wire 700. FIG. 11 shows first switches S60 to S63 connected between the terminals SP11 to SP13 and SP16 and the signal wire 503 and second switches S70 to S73 connected between the terminals SP11 to SP13 and SP16 and the voltage wire 700 of these first switches and second switches. In addition, the second unit drive electrode circuit UCG2(0) includes an inverter circuit IV2 to which the selection signal TP(0) from the semiconductor device for touch 7 is supplied, a buffer circuit BF2 to which the selection signal TP(0) is supplied, and a 2-input AND circuit ND1 that receives the output of the inverter circuit IV2 and the control signal VCOMSEL. The buffer circuit BF2 outputs a switch control signal SW1_C in phase with the selection signal TP(0). The inverter circuit IV2 forms an inverted signal obtained by inverting the phase of the selection signal TP(0). The 2-input AND circuit ND1 receives the control signal VCOMSEL and the inverted signal and outputs a switch control signal SW2_C.

Among the first switches, the first switches (S60 to S62 in FIG. 11) connected between the terminals other than the terminal SP16 (SP11 to SP13 in FIG. 11) and the signal wire 503 are controlled by the switch control signal SW1_C. Also, among the second switches, the second switches (S70 to S72 in FIG. 11) connected between the terminals other than the terminal SP16 (SP11 to SP13 in FIG. 11) and the voltage wire 700 are controlled by the switch control signal SW2_C. Meanwhile, the first switch S63 connected between the terminal SP16 and the signal wire 503 is configured to be always turned off In addition, the second switch S73 connected between the terminal SP16 and the voltage wire 700 is also configured to be always turned off. For example, a low-level control signal is made to be always supplied to the first switch S63 and the second switch S73.

The second unit drive electrode driver 12-2(0) operates in the same manner as the unit drive electrode driver 12(0) described with reference to FIG. 8. Namely, when the voltage of the selection signal TP(0) is at a high level in the touch detection period, the buffer circuit BF2 outputs the switch control signal SW1_C at a high level. At this time, the inverter circuit IV2 outputs an inverted signal at a low level. Since the control signal VCOMSEL is set to the high level in the touch detection period, the 2-input AND circuit ND1 outputs the inverted signal from the inverter circuit IV2 as the switch control signal SW2_C. Namely, the 2-input AND circuit ND1 outputs the switch control signal SW2_C at a low level. Accordingly, the first switches other than the first switch S63 (S60 to S62) are turned on and the second switches (S70 to S72) are turned off. On the other hand, when the voltage of the selection signal TP(0) is at a low level, the buffer circuit BF2 outputs the switch control signal SW1_C at a low level and the inverter circuit IV2 outputs an inverted signal at a high level. The 2-input AND circuit ND1 outputs the high-level inverted signal as the switch control signal SW2_C. Accordingly, the second switches other than the second switch S73 (S70 to S72) are turned on and the first switches (S60 to S62) are turned off.

As described above, when the common electrode TL(0) is specified as a selected common electrode, the semiconductor device for touch 7 sets the selection signal TP(0) corresponding to the common electrode TL(0) to the high level. Meanwhile, when the common electrode TL(0) is specified as a non-selected common electrode, the semiconductor device for touch 7 sets the selection signal TP(0) corresponding to the common electrode TL(0) to the low level. As a result, when the common electrode TL(0) is specified as a selected common electrode, the first switches other than the switch S63 (S60 to S62) are turned on and the control signal TSVCOM whose voltage changes periodically is supplied to the terminals SP11 to SP15 as a drive signal via these first switches. Meanwhile, when the common electrode TL(0) is specified as a non-selected common electrode, the second switches other than the switch S73 (S70 to S72) are turned on and the voltage VCOMDC corresponding to the ground voltage is supplied from the voltage wire 700 to the terminals SP11 to SP15 via these second switches.

In the touch detection period, as described with reference to FIG. 8, the switch circuit SW2 is turned on. Thus, the selection signal TP(0) supplied to the input node n2 of the switch circuit SW2 is supplied to the terminal SP16 via the switch circuit SW2.

Namely, when the selection signal TP(0) is at a high level in the touch detection period, the voltage of the terminals SP11 to SP15 changes in accordance with the change of the voltage of the control signal TSVCOM and the terminal SP16 has a voltage corresponding to the voltage of the selection signal TP(0).

The unit switching circuit 100(0) includes a plurality of third switches controlled by the control signal VCOMSEL. Here, the third switch is a 2-input switch having a common terminal C and two input terminals P1 and P2 and connects the common terminal C to the input terminal P1 or P2 in accordance with the voltage of the control signal VCOMSEL. The common terminal C of each of the plurality of third switches is connected to the common electrode TL(0) and the input terminal P1 of each of them is connected to a voltage wire 111 to which the voltage VCOMDC is supplied. The input terminal P2 of the third switch is connected to the terminals SP11 to SP16. In FIG. 11, among the third switches, the third switches whose input terminals P2 are connected to the terminals SP11 to SP13 and SP16 are denoted as S50 to S53. In the second embodiment, among the third switches connected to the terminals SP11 to SP16, the third switch S53 whose input terminal P2 is connected to the terminal SP16 is controlled so that the common terminal C is always connected to the input terminal P1 regardless of the voltage of the control signal VCOMSEL.

In the second embodiment, the third switch connects the common terminal C to the input terminal P1 when the control signal VCOMSEL is at a low level, and it connects the common terminal C to the input terminal P2 when the control signal VCOMSEL is at a high level. Incidentally, for example, a low-level control signal is always supplied to the third switch S53 among the third switches.

Accordingly, since the control signal VCOMSEL is set to the high level in the touch detection period, the common terminal C is connected to the corresponding terminals SP11 to SP15 via the input terminal P2 in the third switches other than the third switch S53 (S50 to S52). Namely, in the touch detection period, the common electrode TL(0) is connected to the terminals SP11 to SP15. As described in the first embodiment, the switches S11 and S12 in the unit signal line selector 6(0) are both turned on in the touch detection period.

Thus, in the touch detection period, the drive signal supplied from the second unit drive electrode driver 12-2(0) to the terminals SP11 to SP15 is supplied to the signal lines other than the signal line SL(0)2(B) functioning as the control line S S(0) and the common electrode TL(0).

Also, since the common electrode TL(0) is connected to the voltage wire 700 via the third switches S50 to S53 in the display period, a drive voltage for display can be provided to the common electrode TL(0). In the display period, the semiconductor device for touch 7 sets the selection signals TP(0) to TP(p) to the low level. In addition, the control signal VCOMSEL is set to the low level. Accordingly, the switch control signal SW1_C at a low level is output from the buffer circuit BF2 and the switch control signal SW2_C at a low level is output also from the 2-input AND circuit ND1. As a result, the first switches S60 to S62 and the second switches S70 to S72 are turned off and the output of the second unit drive electrode driver 12-2(0) is put into a high-impedance state. Accordingly, the image signal supplied from the semiconductor device for driver DDIC to the terminals SP11 to SP16 is supplied to the unit signal line selector 6(0) and is then supplied to an appropriate signal line.

In the second embodiment, the first switch S63, the second switch S73 and the third switch S53 do not function as a switch. Therefore, the first switch S63 and the second switch S73 do not have to be provided. Further, the third switch S53 may be a wire connecting the common electrode TL(0) and the voltage wire 700. However, by providing the first switch S63, the second switch S73 and the third switch S53, the second unit drive electrode driver 12-2(0) and the switching circuit 100(0) can be constituted by repeatedly arranging the first switch, second switch and third switch, so that the design and manufacture can be facilitated. When viewed from the viewpoint of not functioning as a switch, each of the first switch S63, the second switch S73 and the third switch S53 can be regarded as a dummy switch.

The first unit drive electrode circuit UCG1(0) and the second unit drive electrode circuit UCG2(0) have been described as a representative example, but the same is true of the remaining first unit drive electrode circuits UCG1(1) to UCG1(p) and second unit drive electrode circuits UCG2(1) to UCG2(p).

<Operation of First Unit Drive Electrode Circuit and Second Unit Drive Electrode Circuit>

Figure 12:
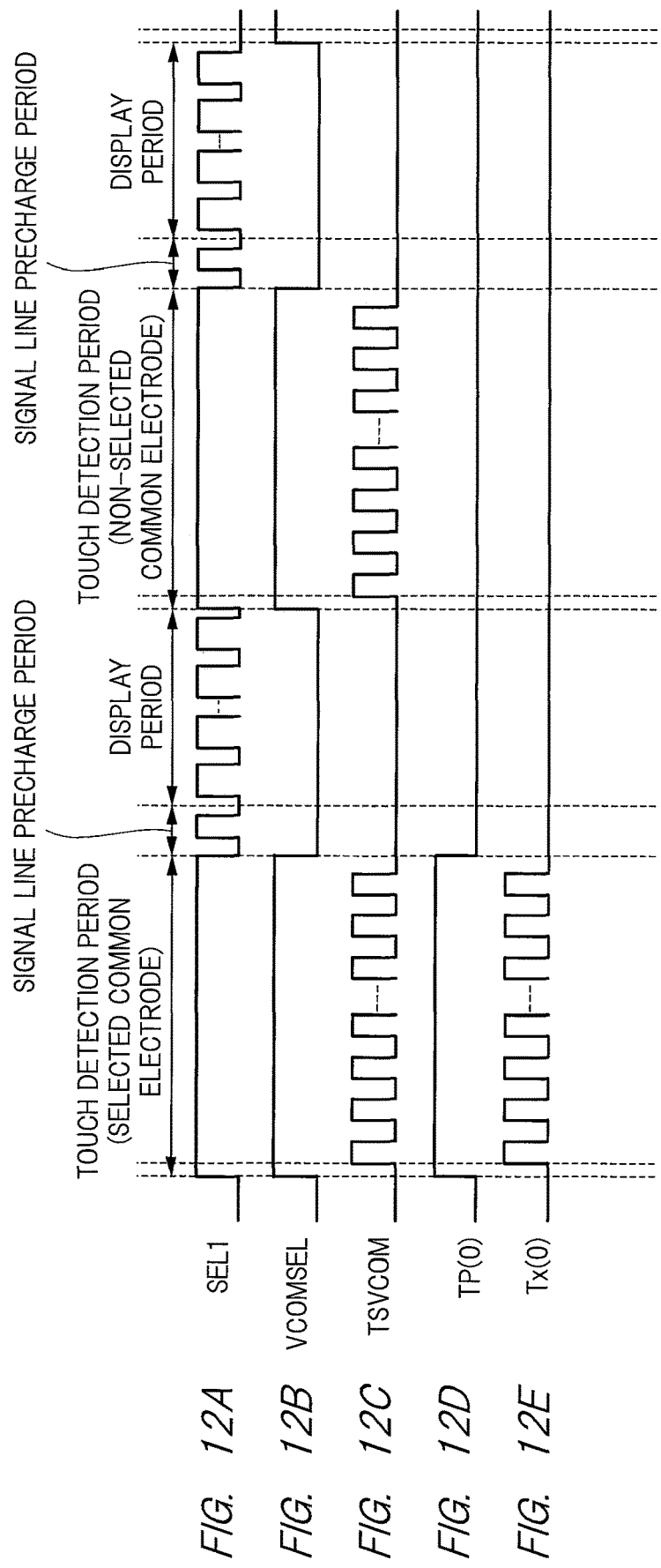
FIG. 12A to FIG. 12E are waveform charts showing an operation of the liquid crystal display device with a touch detection function according to the second embodiment.

Next, the operation of the liquid crystal display device 1 shown in FIG. 11 will be described. FIG. 12A to FIG. 12E are waveform charts showing the operation of the liquid crystal display device 1 shown in FIG. 11. In FIG. 12, the horizontal axis represents the time and the vertical axis represents the voltage. FIG. 12A shows a waveform of the selection signal SEL1, FIG. 12B shows a waveform of the control signal VCOMSEL, and FIG. 12C shows a waveform of the control signal TSVCOM.

In FIG. 12, waveforms in the touch detection period and the display period are shown, and waveforms concerning the common electrode TL(0) shown in FIG. 11 are shown for the touch detection period. Namely, FIG. 12D shows a waveform of the selection signal TP(0) and FIG. 12E shows a waveform of the drive signal Tx(0) supplied to the common electrode TL(0). In FIG. 12, "touch detection period (selected common electrode)" indicates the case where the common electrode TL(0) is specified as a selected common electrode by the semiconductor device for touch 7. Also, "touch detection period (non-selected common electrode)" indicates the case where the common electrode TL(0) is specified as a non-selected common electrode by the semiconductor device for touch 7.

In FIG. 12, operations in the signal line precharge period and the display period are almost the same as those described with reference to FIG. 9, and thus only differences will be described. In the first embodiment, the voltage VCOMDC corresponding to the ground voltage is supplied from the unit drive electrode circuit UCG1(0) to the common electrode TL(0) in the signal line precharge period and the display period. On the other hand, in the second embodiment, the voltage VCOMDC corresponding to the ground voltage is supplied to the common electrode TL(0) from both of the first unit drive electrode circuit UCG1(0) and the unit switching circuit 100(0). Accordingly, the voltage of the common electrode TL(0) for display can be more stabilized.

In the touch detection period, the semiconductor device for driver DDIC sets both of the selection signals SEL1 and SEL2 to the high level. Accordingly, both of the switches S11 and S12 shown in FIG. 11 are turned on. Also, the semiconductor device for touch 7 sets the control signal VCOMSEL to the high level and changes the voltage of the control signal TSVCOM periodically.

When the touch detection period is the touch detection period (selected common electrode), the semiconductor device for touch 7 sets the selection signal TP(0) to the high level. Since the control signal VCOMSEL is at a high level and the control signal xVCOMSEL is at a low level, the switch circuit SW2 is brought into conduction and the selection signal TP(0) at a high level is supplied to the terminal SP16 via the switch circuit SW2.

At this time, the output terminal (○ mark in FIG. 7) of the semiconductor device for driver DDIC is in a high-impedance state, and thus the selection signal TP(0) supplied to the terminal SP16 propagates through the control line SS(0)[SL(0)2(B)] and is supplied to the first unit drive electrode circuit UCG1(0).

In the first unit drive electrode circuit UCG1(0), the control signal VCOMSEL is at a high level, and thus the switches S40 to S43 in the switch circuit SW3 are brought into conduction and the P-type MOSFET TP2 is turned off. Therefore, the control line SS(0) is connected to the signal wire 800 via the switch S40 and the voltage of the signal wire 800 is set to the high level. Since the voltage of the signal wire 800 is set to the high level, the output of the buffer circuit BF1 is set to the high level and the output of the inverter circuit IV1 is set to the low level. Accordingly, the switches S20 to S23 are turned off and the switches S30 to S33 are turned on. Since the switches S30 to S33 are turned on, the common electrode TL(0) is connected to the signal wire 503 via the switches S30 to S33. Since the voltage of the control signal TSVCOM in the signal wire 503 periodically changes, the drive signal Tx(0) whose voltage changes periodically as shown in FIG. 11E is supplied to the drive electrode TL(0).

Also, since the selection signal TP(0) is at a high level, the switch control signal SW1_C which is an output signal of the buffer circuit BF2 in the second unit drive electrode circuit UCG2(0) is set to the high level. At this time, an inverted signal output from the inverter circuit IV2 is set to the low level and the switch control signal SW2_C at a low level is output from the 2-input AND circuit ND1. Accordingly, the first switches (S60 to S62) are turned on and the second switches (S70 to S72) are turned off. Consequently, the control signal TSVCOM whose voltage changes periodically is supplied to the terminals SP11 to SP15 via the first switches.

Since the control signal VCOMSEL is at a high level as shown in FIG. 12B, the common terminal C of the third switches (S50 to S52) in the unit switching circuit 100(0) is connected to the input terminal P2. Thus, the control signal TSVCOM supplied to the terminals SP11 to SP15 is supplied to the common electrode TL(0) via the third switches. Also, since the switches S11 and S12 in the unit signal line selector 6(0) are in an on state, the control signal TSVCOM is supplied also to the signal lines other than the signal line SL(0)2(B) functioning as the control line SS(0).

Accordingly, the control signal TSVCOM is supplied as the drive signal Tx(0) to the common electrode TL(0) from both ends thereof, and whether or not the neighborhood of the drive electrode TL(0) is touched can be detected as described with reference to FIG. 2.

Meanwhile, when the touch detection period is the touch detection period (non-selected common electrode), the semiconductor device for touch 7 sets the selection signal TP(0) to the low level. Since the control signal VCOMSEL is at a high level and the control signal xVCOMSEL is at a low level, the switch circuit SW2 is brought into conduction and the selection signal TP(0) at a low level is supplied to the terminal SP16 via the switch circuit SW2. At this time, since the output terminal (○ mark in FIG. 7) of the semiconductor device for driver DDIC is in a high-impedance state, the selection signal TP(0) supplied to the terminal SP16 propagates through the control line SS(0) and is supplied to the first unit drive electrode circuit UCG1(0).

In the first unit drive electrode circuit UCG1, the control signal VCOMSEL is at a high level, and thus the switches S40 to S43 in the switch circuit SW3 are brought into conduction and the P-type MOSFET TP2 is turned off. Therefore, the control line SS(0) is connected to the signal wire 800 via the switch circuit SW1 and the voltage of the signal wire 800 is set to the low level. Since the voltage of the signal wire 800 is set to the low level, the output of the buffer circuit BF1 is set to the low level and the output of the inverter circuit IV1 is set to the high level. Accordingly, the switches S30 to S33 are turned off and the switches S20 to S23 are turned on. Since the switches S20 to S23 are turned on, the common electrode TL(0) is connected to the voltage wire 700 via the switches S20 to S23. As a result, the control signal TSVCOM whose voltage changes periodically is not supplied to the common electrode TL(0) and the voltage VCOMDC corresponding to the ground voltage is supplied thereto.

In the second unit drive electrode circuit UCG2(0), the selection signal TP(0) is set to the low level, and thus the buffer circuit BF2 outputs the switch control signal SW1_C at a low level. Also, the inverter circuit IV2 outputs a high-level inverted signal. At this time, the control signal VCOMSEL is at a high level, and thus the 2-input AND circuit ND1 outputs the switch control signal SW2_C at a high level.

Accordingly, the first switches (S60 to S62) are turned off and the second switches (S70 to S72) are turned on. Since the second switches are turned on, the voltage VCOMDC corresponding to the ground voltage is supplied to the terminals SP11 to SP15 via the second switches. Accordingly, the voltage VCOMDC is supplied to the common electrode TL(0) and the signal lines other than the signal line corresponding to the control line SS(0).

Also in this case, the voltage VCOMDC is supplied at both ends of the common electrode TL(0), and thus the voltage of the common electrode TL(0) can be more stabilized. Since the fixed voltage (VCOMDC) is supplied to the common electrode TL(0), the voltage of a detection signal does not change even if the neighborhood of the common electrode TL(0) is touched, and the presence or absence of a touch is not detected.

The common electrode TL(0), the first unit drive electrode circuit UCG1(0) and the second unit drive electrode circuit UCG2(0) have been described as a representative example, but the configuration and operation are the same also in the remaining common electrodes TL(1) to TL(p), first unit drive electrode circuits UCG1(1) to UCG1($p$) and second unit drive electrode circuits UCG2(1) to UCG2($p$).

In the second embodiment, the common electrodes TL(0) to TL(p) are driven by both of the first drive electrode circuit CGW1 and the second drive electrode circuit CGW2 arranged along the short sides 2-U and 2-D of the liquid crystal panel 2. Thus, the common electrodes can be driven even if driving ability of each of the first drive electrode circuit CGW1 and the second drive electrode circuit CGW2 is decreased, so that the lower and upper edge frames of the liquid crystal panel 2 can be made narrower. Also, by using the signal line that transmits an image signal in the display period as the control line serving as the wire that transmits the selection signal from the second drive electrode circuit CGW2 to the first drive electrode circuit CGW1 in the touch detection period, the increase in size of the lateral edge frame of the display panel 2 can be suppressed.

In FIG. 10 to FIG. 12, the example in which the signal line SL(0)2(B) is used as the control line SS(0) has been described, but the present embodiment is not limited to this. At least some of the signal lines can be used as a control line.

Third Embodiment

<Configuration of Liquid Crystal Display Device 1>

Figure 13:
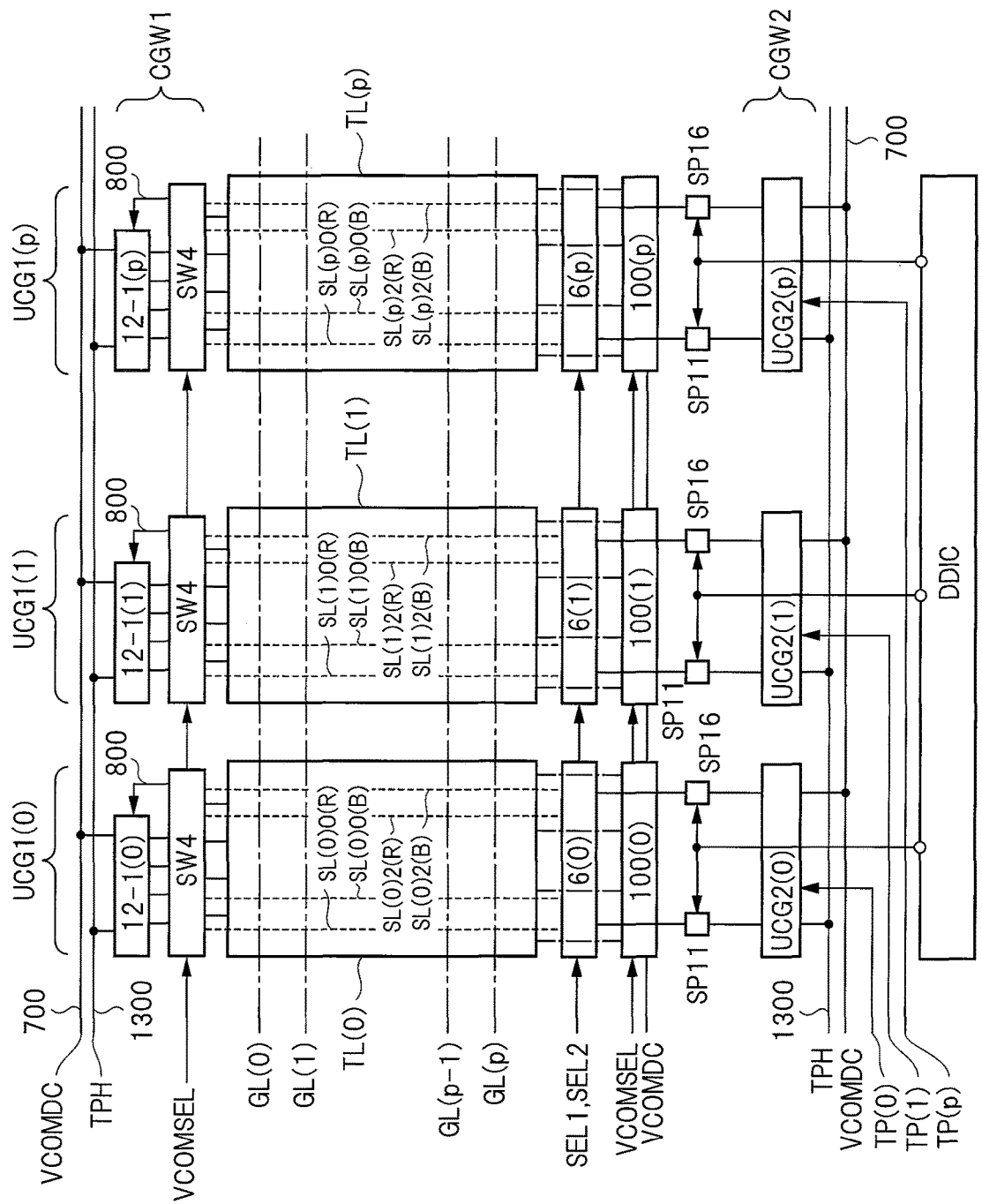
FIG. 13 is a block diagram showing the configuration of the liquid crystal display device with a touch detection function according to the third embodiment.

FIG. 13 is a block diagram showing the configuration of the liquid crystal display device 1 according to the third embodiment. FIG. 13 shows the common electrodes, the first circuit CGW1, the second circuit CGW2 and the semiconductor device for driver DDIC of the module 500 shown in FIG. 5 in detail. Though schematically, FIG. 13 is also depicted in conformity to an actual arrangement.

The configuration of the liquid crystal display device shown in FIG. 13 is similar to the configuration of the liquid crystal display device shown in FIG. 10. Here, differences from the liquid crystal display device shown in FIG. 10 will be mainly described. First, an overview of the differences will be described. In the liquid crystal display device 1 according to the third embodiment, the semiconductor device for touch 7 supplies a selection signal whose voltage changes periodically to the common electrode specified as a selected common electrode and supplies a selection signal whose voltage value does not change temporally to the common electrode specified as a non-selected common electrode in the touch detection period. Each of the first circuit CGW1 and the second circuit CGW2 includes a drive electrode circuit which, when a selection signal that changes periodically is supplied, alternately connects the common electrode corresponding to the selection signal to a first voltage (TPH) and a second voltage (VCOMDC) in synchronization with the selection signal. Here, like in the second embodiment, the first circuit CGW1 is referred to as the first drive electrode circuit CGW1 and the second circuit CGW2 is referred to as the second drive electrode circuit CGW2.

The first drive electrode circuit CGW1 includes a plurality of first unit drive electrode circuits UCG1(0) to UCG1($p$) like in the second embodiment. These first unit drive electrode circuits UCG1(0) to UCG1($p$) correspond to the common electrodes TL(0) to TL(p) in a one-to-one manner and have the same configuration. When described with using the first unit drive electrode circuit UCG1(0) as a representative example, the first unit drive electrode circuit UCG1(0) includes the first unit drive electrode driver 12-1(0) and a switch circuit SW4. When the common electrode TL(0) is specified as a selected common electrode, the first unit drive electrode driver 12-1(0) alternately connects the common electrode TL(0) to a first voltage wire 1300 and a second voltage wire 700 in synchronization with voltage change of the selection signal supplied via the signal wire 800. Here, the first voltage TPH at a high level is supplied to the first voltage wire 1300 and the second voltage VCOMDC corresponding to the ground voltage is supplied to the second voltage wire 700. The first voltage TPH is a voltage with a higher voltage value than the second voltage VCOMDC.

The switch circuit SW4 is controlled by the control signal VCOMSEL and transmits the selection signal supplied via the signal line SL(0) to the signal wire 800 in the touch detection period. FIG. 13 shows the signal lines SL(0)0(R), SL(0)0(B), SL(0)2(R) and SL(0)2(B) as the signal line SL(0).

The second drive electrode circuit CGW2 also includes a plurality of second unit drive electrode circuits UCG2(0) to UCG2(*p*). These second unit drive electrode circuits UCG2(0) to UCG2(*p*) correspond to the common electrodes TL(0) to TL(p) in a one-to-one manner and have the same configuration. When described with using the second unit drive electrode circuit UCG2(0) as a representative example, when the selection signal TP(0) specifies the common electrode TL(0) as a selected common electrode in the touch detection period, the second unit drive electrode circuit UCG2(0) alternately connects the terminals SP11 to SP16 to the first voltage wire 1300 and the second voltage wire 700 in synchronization with voltage change of the selection signal TP(0). The unit signal line selector 6(0) connects the terminals SP11 to SP16 to the common electrode TL(0) and the signal line SL(0) in the touch detection period like in the second embodiment. Thus, the second unit drive electrode circuit UCG2(0) can be regarded as a second drive electrode driver.

The first unit drive electrode circuit UCG1(0) and the second unit drive electrode circuit UCG2(0) have been described as a representative example, but the configuration and operation are the same also in the remaining first unit drive electrode circuits UCG1(1) to UCG1(*p*) and second unit drive electrode circuits UCG2(1) to UCG2(*p*).

<Configuration of First Unit Drive Electrode Circuit and Second Unit Drive Electrode Circuit>

Next, the configuration of the first unit drive electrode circuits UCG1(0) to UCG1(*p*) and the second unit drive electrode circuits UCG2(0) to UCG2(*p*) shown in FIG. 13 will be described. Here, the first unit drive electrode circuit UCG1(0) and the second unit drive electrode circuit UCG2(0) will be described as a representative example with reference to FIG. 14.

Figure 14:
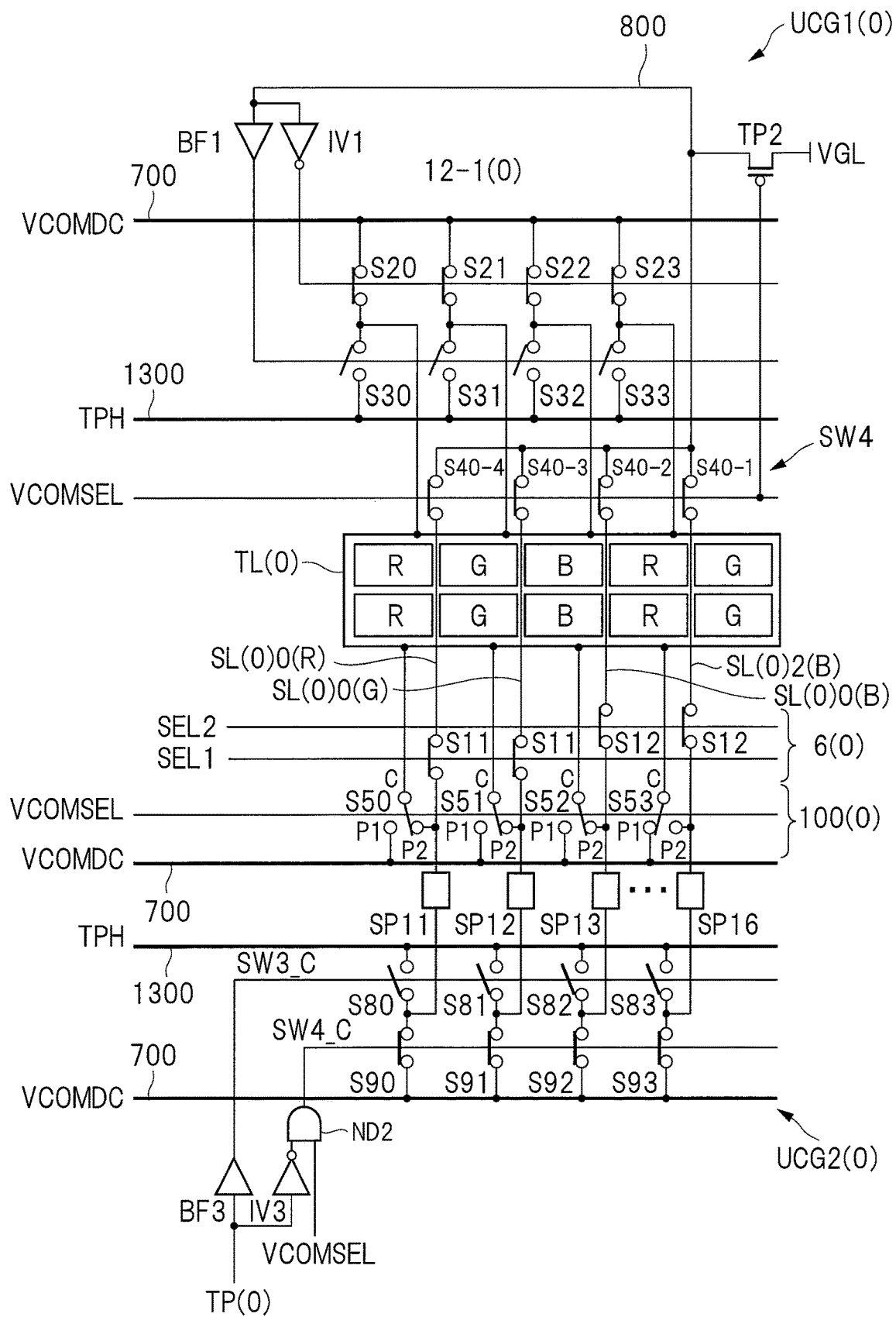
FIG. 14 is a circuit diagram showing the configuration of the liquid crystal display device with a touch detection function according to the third embodiment.

FIG. 14 is a circuit diagram showing the configuration of principal parts of the liquid crystal display device 1 according to the third embodiment. Since the configuration of the circuit shown in FIG. 14 is similar to the configuration of the circuit shown in FIG. 11, differences will mainly be described here.

In the second embodiment, each of the first unit drive electrode circuit UCG1(0) and the second unit drive electrode circuit UCG2(0) operates to supply the control signal TSVCOM whose voltage changes periodically to the common electrode TL(0) when the selection signal TP(0) is at a high level. Meanwhile, in the third embodiment, when the voltage of the selection signal TP(0) changes periodically, the common electrode TL(0) is alternately connected to the first voltage wire 1300 and the second voltage wire 700 in synchronization with the voltage change. Accordingly, even if the driving ability of the circuit that forms the control signal TSVCOM is low, the voltage of the selected common electrode can be changed within a desired time.

First, the first unit drive electrode circuit UCG1(0) will be described. The configuration of the first unit drive electrode driver 12-1(0) included in the first unit drive electrode circuit UCG1(0) is similar to that of the first unit drive electrode driver 12(0) shown in FIG. 11. Namely, the first unit drive electrode driver 12-1(0) includes the P-type MOSFET TP2, the switches S20 to S23 and S30 to S33, the inverter circuit IV1 and the buffer circuit BF1. In FIG. 11, the switches S30 to S33 are connected between the common electrode TL(0) and the signal wire 503. In the third embodiment, however, the switches S30 to S33 are connected between the common electrode TL(0) and the first voltage wire 1300.

The switch circuit SW4 included in the first unit drive electrode circuit UCG1(0) includes switches S40-1 to S40-4 controlled by the control signal VCOMSEL. Here, the switches S40-1 to S40-4 are connected between the signal wire 800 and the signal line SL(0). FIG. 14 shows the signal lines SL(0)0(R), SL(0)0(G), SL(0)0(B) and SL(0)2(B) as examples of the signal line SL(0). These signal lines SL(0)0(R), SL(0)0(G), SL(0)0(B) and SL(0)2(B) are used to transmit an image signal in the display period and are used as signal lines that transmit a selection signal in the touch detection period like in the second embodiment. The switches S40-1 to S40-4 are turned off by the control signal VCOMSEL in the display period and so function as a separation circuit that separates the signal wire 800 and the signal lines SL(0)0(R), SL(0)0(G), SL(0)0(B) and SL(0)2(B). When viewed from the viewpoint of transmitting a selection signal, the signal lines SL(0)0(R), SL(0)0(G), SL(0)0(B) and SL(0)2(B) can be regarded as constituting the control line SS(0).

In the touch detection period, a selection signal is supplied to the signal wire 800 via the signal lines SL(0)0(R), SL(0)0(G), SL(0)0(B) and SL(0)2(B) and the switches S40-1 to S40-4 like in the second embodiment.

Next, the second unit drive electrode circuit UCG2(0) will be described. The second unit drive electrode circuit UCG2(0) includes a plurality of fourth switches connected between the terminals SP11 to SP16 and the first voltage wire 1300 and a plurality of fifth switches connected between the terminals SP11 to SP16 and the second voltage wire 700. In addition, the second unit drive electrode circuit UCG2(0) includes an inverter circuit IV3, a buffer circuit BF3 and a 2-input AND circuit ND2. The buffer circuit BF3 and the inverter circuit IV3 receive the selection signal TP(0) from the semiconductor device for touch 7 and the buffer circuit BF3 outputs a signal in phase with the selection signal TP(0) as a switch control signal SW3_C. Also, the inverter circuit IV3 inverts the phase of the selection signal TP(0) and supplies the inverted signal to the 2-input AND circuit ND2. The 2-input AND circuit ND2 receives the inverted signal and the control signal VCOMSEL and outputs a switch control signal SW4_C.

In FIG. 14, switches S80 to S83 connected between the terminals SP11 to SP13 and SP16 and the first voltage wire 1300 are shown as the fourth switches. Also, switches S90 to S93 connected between the terminals SP11 to SP13 and SP16 and the second voltage wire 700 are shown as the fifth switches. The fourth switches S80 to S83 are controlled by the switch control signal SW3_C and the fifth switches S90 to S93 are controlled by the switch control signal SW4_C.

In the touch detection period, the control signal VCOMSEL is set to the high level. When the semiconductor device for touch 7 specifies the common electrode TL(0) as a selected common electrode, the semiconductor device for touch 7 changes the voltage of the selection signal TP(0)

periodically. Accordingly, the voltage of the switch control signal SW3_C output from the buffer circuit BF3 changes periodically. Also, since the control signal VCOMSEL at a high level is supplied, the 2-input AND circuit ND2 outputs a signal obtained by inverting the phase of the selection signal TP(0) as the switch control signal SW4_C.

Accordingly, the fourth switches (S80 to S83) and the fifth switches (S90 to S93) are alternately turned on. As a result, the terminals SP11 to SP16 are alternately connected to the first voltage wire 1300 and the second voltage wire 700 via the fourth switches and the fifth switches.

Meanwhile, when the semiconductor device for touch 7 specifies the common electrode TL(0) as a non-selected common electrode, the semiconductor device for touch 7 outputs the selection signal TP(0) at a low level. In this case, the switch control signal SW3_C is set to a low level, the switch control signal SW4_C is set to a high level, and the respective voltage values are maintained. As a result, the fourth switches (S80 to S83) are turned off and the fifth switches (S90 to S93) are turned on. Thus, the terminals SP11 to SP16 are connected to the second voltage wire 700 via the fifth switches.

The unit switching circuit 100(0) is constituted of a plurality of third switches like in the second embodiment. FIG. 14 shows the switches S50 to S53 as the third switches like in the second embodiment. In the third embodiment, each of the third switches connects the common electrode TL(0) to the signal line SL(0) or the terminals SP11 to SP16 in accordance with the control signal VCOMSEL unlike in the second embodiment. Namely, in the second embodiment, the third switch S53 functions as a dummy switch as shown in FIG. 11, but in the third embodiment, the third switch S53 functions as a switch whose common terminal C is connected to the voltage wire 700 or the terminal SP16 via the input terminal P1 or P2 in accordance with the control signal VCOMSEL.

As described in the first and second embodiments, the selection signals SEL1 and SEL2 complementarily turn on the switches S11 and S12 constituting the unit signal line selector 6(0) in the display period. Accordingly, an image signal supplied to the terminals SP11 to SP16 is supplied to the appropriate signal line SL(0) by the unit signal line selector 6(0). Meanwhile, in the touch detection period, each of the selection signals SEL1 and SEL2 is set to the high level. As a result, the switches S11 and S12 constituting the unit signal line selector 6(0) are both turned on.

In the display period, an image signal is supplied from the semiconductor device for driver DDIC to the terminals SP11 to SP16 like in the second embodiment. Meanwhile, in the touch detection period, the semiconductor device for driver DDIC puts the output terminal thereof (○ mark in FIG. 13) into a high-impedance state. Since the control signal VCOMSEL is set to the high level, the common terminal C of each of the third switches S50 to S53 constituting the unit switching circuit 100(0) is connected to the input terminal P2 in the touch detection period. Further, in this period, each of the switches S11 and S12 of the unit signal line selector 6(0) is turned on.

Thus, when the voltage of the selection signal TP(0) changes periodically in the touch detection period, the terminals SP11 to SP16, the common electrode TL(0) and the signal line SL(0) are alternately connected to the first voltage wire 1300 and the second voltage wire 700 in synchronization with voltage change of the selection signal TP(0) and the voltages thereof change. In other words, the drive signal Tx(0) in accordance with the selection signal TP(0) is supplied to the terminals SP11 to SP16, the common electrode TL(0) and the signal line SL(0). The change of the voltage in the signal line SL(0) is supplied to the signal wire 800 via the switches S40-1 to S40-4. In other words, the drive signal Tx(0) formed by the second unit drive electrode circuit UCG2(0) is supplied to the first unit drive electrode circuit UCG1(0) as a selection signal and is then supplied to the drive electrode driver 12-1(0) included in the first unit drive electrode circuit UCG1(0).

With the change of the voltage in the signal wire 800, the switches S30 to S33 and the switches S20 to S23 constituting the first unit drive electrode driver 12-1(0) are alternately turned on. The switches S30 to S33 are connected between the first voltage wire 1300 and the common electrode TL(0) and the switches S20 to S23 are connected between the second voltage wire 700 and the common electrode TL(0). Accordingly, the first unit drive electrode circuit UCG1(0) also supplies the drive signal Tx(0) to the corresponding common electrode TL(0) in synchronization with the voltage change of the selection signal TP(0). Namely, the drive signal Tx(0) is supplied to the common electrode TL(0) from the first unit drive electrode circuit UCG1(0) and the second unit drive electrode circuit UCG2(0) arranged at both ends thereof, so that the common electrode TL(0) is driven. Naturally, the drive signal Tx(0) from the first unit drive electrode circuit UCG1(0) and the drive signal Tx(0) from the second unit drive electrode circuit UCG2(0) are in phase with each other.

Meanwhile, when the selection signal TP(0) specifies the common electrode TL(0) as a non-selected common electrode in the touch detection period, that is, when the selection signal TP(0) is maintained at the ground voltage, the fifth switches (S90 to S93) are turned on in the second unit drive electrode circuit UCG2(0), and the fourth switches (S80 to S83) are turned off. Accordingly, the second voltage VCOMDC in the second voltage wire 700 is supplied to the terminals SP11 to SP16, the common electrode TL(0) and the signal line SL(0) via the fifth switches (S90 to S93). The second voltage VCOMDC in the signal line SL(0) is supplied to the signal wire 800 via the switches S40-1 to S40-4. Accordingly, the switches S20 to S23 in the drive electrode driver 12-1(0) are turned on, so that the second voltage VCOMDC is supplied also from the first unit drive electrode circuit UCG1(0) to the common electrode TL(0) via the second voltage wire 700.

In the display period, the semiconductor device for touch 7 sets each of the selection signals TP(0) to TP(p) to the low level. At this time, the control signal VCOMSEL is set to the low level. As a result, the fourth switches (S80 to S83) and the fifth switches (S90 to S93) in the second unit drive electrode circuit UCG2(0) are turned off. Accordingly, the output of the second unit drive electrode circuit UCG2(0) is put into a high-impedance state. Meanwhile, since the common terminal C of the third switches (S50 to S53) constituting the unit switching circuit 100(0) is connected to the input terminal P1 by the control signal VCOMSEL at a low level in the display period, the common electrode TL(0) is connected to the second voltage wire 700 by the unit switching circuit 100(0). At this time, the P-type MOSFET TP2 in the first unit drive electrode circuit UCG1(0) is also turned on, and thus the switches S20 to S23 in the drive electrode driver 12-1(0) are also turned on. Therefore, the second voltage VCOMDC is supplied to the common electrode TL(0) also from the first unit drive electrode circuit UCG1(0).

As a result, in the display period, the second voltage VCOMDC is supplied from both ends of the common electrode TL(0) by the first unit drive electrode circuit UCG1(0) and the unit switching circuit 100(0). In addition, the image signal displayed in the display period is supplied from the semiconductor device for driver DDIC to the terminals SP11 to SP16 and is then transmitted to the signal line SL(0).

As described above, since the drive signal Tx(0) is supplied from both ends of the drive electrode TL(0) in the touch detection period, the first unit drive electrode circuit UCG1(0) and the second unit drive electrode circuit UCG2(0) can be reduced in size, and the reduction in width of the upper and lower edge frames can be achieved. In addition, since the signal line that transmits an image signal in the display period is used as a control line that transmits a selection signal in the touch detection period, it is possible to suppress the increase in size of the right and left edge frames. Further, since the second voltage VCOMDC which is a drive voltage for display is supplied from both ends of the drive electrode TL(0) in the display period, the voltage of the common electrode in the display period can be stabilized.

<Operation of First Unit Drive Electrode Circuit and Second Unit Drive Electrode Circuit>

Next, the operation of the liquid crystal display device 1 shown in FIG. 14 will be described. FIG. 15A to FIG. 15E are waveform charts showing the operation of the liquid crystal display device 1 shown in FIG. 14. In FIG. 15, the horizontal axis represents the time and the vertical axis represents the voltage. FIG. 15A shows a waveform of the selection signal SEL1, FIG. 15B shows a waveform of the control signal VCOMSEL, and FIG. 15C shows a waveform of the selection signal TP(0).

FIG. 15D shows a waveform of the switch control signal SW3_C that controls the fourth switches and FIG. 15E shows a waveform of the switch control signal SW4_C that controls the fifth switches. In FIG. 15, "touch detection period (selected common electrode)" indicates the case where the common electrode TL(0) is specified as a selected common electrode by the semiconductor device for touch 7. Also, "touch detection period (non-selected common electrode)" indicates the case where the common electrode TL(0) is specified as a non-selected common electrode by the semiconductor device for touch 7.

In FIG. 15, operations in the signal line precharge period and the display period are the same as those described with reference to FIG. 12, and thus the description thereof is omitted.

In the touch detection period, the semiconductor device for driver DDIC sets both of the selection signals SEL1 and SEL2 to the high level. Accordingly, the switches S11 and S12 shown in FIG. 14 are both turned on. Also, the control signal VCOMSEL is set to the high level.

When the touch detection period is the touch detection period (selected common electrode), the semiconductor device for touch 7 changes the voltage of the selection signal TP(0) periodically. Since the control signal VCOMSEL is at a high level, the 2-input AND circuit ND2 outputs an inverted signal of the selection signal TP(0) as the switch control signal SW4_C. Accordingly, as shown in FIG. 15D and FIG. 15E, the switch control signal SW3_C changes in phase with the selection signal TP(0) and the switch control signal SW4_C changes in reversed phase with the selection signal TP(0). Accordingly, the fourth switches (S80 to S83) and the fifth switches (S90 to S93) are alternately turned on. Since both of the selection signals SELL and SEL2 are at a high level, the signal line SL(0) is connected to the terminals SP11 to SP16 by the unit signal line selector 6(0). Also, since the control signal VCOMSEL is at a high level, the common electrode TL(0) is connected to the terminals SP11 to SP16 by the unit switching circuit 100(0).

Accordingly, in the touch detection period (selected), the common electrode TL(0) and the signal line SL(0) are alternately connected to the first voltage wire 1300 and the second voltage wire 700 and the voltages thereof periodically change in synchronization with the voltage change of the selection signal TP(0).

Also, the voltage change in the signal line SL(0) is supplied to the signal wire 800 via the switch circuit SW4. With the voltage change in the signal wire 800, the switches S20 to S23 and the switches S30 to S33 in the first unit drive electrode driver 12-1(0) are alternately turned on. As a result, the common electrode TL(0) is alternately connected to the first voltage wire 1300 and the second voltage wire 700 also in the first unit drive electrode circuit UCG1(0).

Accordingly, the first voltage TPH and the second voltage VCOMDC are alternately supplied to the drive electrode TL(0) from the both ends thereof and the voltage thereof changes. Accordingly, as described with reference to FIG. 2, whether or not the neighborhood of the common electrode TL(0) is touched can be detected.

Meanwhile, when the touch detection period is the touch detection period (non-selected common electrode), the semiconductor device for touch 7 sets the selection signal TP(0) to the low level and sets the control signal VCOMSEL to the high level as shown in FIG. 15C and FIG. 15B. Since the selection signal TP(0) is at a low level, the 2-input AND circuit ND2 outputs a high-level inverted signal obtained by inverting the phase of the selection signal TP(0) as the switch control signal SW4_C. Accordingly, the common electrode TL(0) and the signal line SL(0) are connected to the second voltage wire 700 via the fifth switches (S90 to S93) and the second voltage VCOMDC is supplied to the common electrode TL(0) and the signal line SL(0). The voltage of the signal line SL(0) at this time is supplied to the signal wire 800 via the switch circuit SW4. Since the voltage of the signal wire 800 becomes the second voltage VCOMDC corresponding to the ground voltage, the switches S30 to S33 in the first unit drive electrode driver 12-1(0) are turned on. As a result, the common electrode TL(0) is connected to the second voltage wire 700 via the switches S30 to S33 and the second voltage VCOMDC is supplied.

Accordingly, when the common electrode TL(0) is specified as a non-selected common electrode, the second voltage VCOMDC corresponding to the ground voltage is supplied from both ends thereof and the voltage thereof is fixed to the second voltage VCOMDC. Since the fixed voltage (VCOMDC) is supplied, the voltage of a detection signal does not change even if the neighborhood of the common electrode TL(0) is touched, and the presence or absence of a touch is not detected.

The common electrode TL(0), the first unit drive electrode circuit UCG1(0) and the second unit drive electrode circuit UCG2(0) have been described as a representative example, but the configuration and operation are the same also in the remaining common electrodes TL(1) to TL(p), first unit drive electrode circuits UCG1(1) to UCG1(p) and second unit drive electrode circuits UCG2(1) to UCG2(p).

In the third embodiment, the common electrodes TL(0) to TL(p) are driven by both of the first drive electrode circuit CGW1 and the second drive electrode circuit CGW2 arranged along the short sides 2-U and 2-D of the liquid crystal panel 2. Thus, the common electrodes can be driven even if driving ability of each of the first drive electrode circuit CGW1 and the second drive electrode circuit CGW2 is decreased, so that the lower and upper edge frames of the liquid crystal panel 2 can be made narrower. Also, by using the signal line that transmits an image signal in the display period as the control line serving as the wire that transmits the selection signal from the second drive electrode circuit CGW2 to the first drive electrode circuit CGW1 in the touch detection period, the increase in size of the lateral edge frame of the display panel 2 can be suppressed.

In FIG. 13 to FIG. 15, the example in which the signal lines SL(0) corresponding to the common electrode TL(0), that is, the signal lines SL(0)0(R), SL(0)0(G), SL(0)0(B) and SL(0)2(B) in FIG. 14 are used as control lines has been described, but the present embodiment is not limited to this. At least one signal line of the plurality of signal lines corresponding to one common electrode may be used as a control line. However, by using the plurality of signal lines as control lines, the delay of the selection signal can be reduced.

In the range of an idea of the present invention, a person skilled in the art can conceive various modifications and alterations and it should be understood that such modifications and alterations belong to the scope of the present invention.

For example, embodiments obtained by the addition, deletion or design change of elements or the addition, omission or condition change of steps made for each of the above-described embodiments by a person skilled in the art are included in the scope of the present invention as long as they include the gist of the present invention.

In the embodiments, for example, the case in which the common electrodes TL(0) to TL(p) and the signal lines SL(0) to SL(p) extend in the column direction and are arranged in the row direction has been described, but the row direction and the column direction change depending on the viewpoint. Specifically, the case in which the viewpoint is changed and the common electrodes TL(0) to TL(p) and the signal lines SL(0) to SL(p) extend in the row direction and are arranged in the column direction is also included in the scope of the present invention. Further, in FIG. 14, the P-type MOSFET TP2 does not have to be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
    a plurality of pixels arranged in a matrix form and having a first side parallel to a row and a second side opposite to the first side;
    a plurality of scanning lines arranged in each row of the plurality of pixels to supply a scanning signal to the plurality of pixels;
    a plurality of signal lines arranged in each column of the plurality of pixels to supply an image signal to the plurality of pixels;
    a drive electrode circuit which is arranged along the first side; and
    a plurality of drive electrodes which are arranged in the direction of column of the plurality of pixels and to which a drive signal to detect an object is supplied from the drive electrode circuit,
    wherein the signal lines transmit the image signal in a display period, and at least one of the signal lines transmits a control signal to control the drive electrode circuit in a touch detection period.

2. The display device according to claim 1, further comprising:
    a signal line circuit arranged along the second side and connected to the plurality of signal lines,
    wherein the signal line circuit supplies the image signal to the plurality of signal lines in the display period.

3. The display device according to claim 2, further comprising:
    a touch control device which forms the control signal specifying the drive electrode from the plurality of drive electrodes in the touch detection period.

4. A display device comprising:
    a plurality of pixels arranged in a matrix form and having a first side parallel to a row and a second side opposite to the first side;
    a plurality of scanning lines arranged in each row of the plurality of pixels to supply a scanning signal to the plurality of pixels;
    a plurality of signal lines arranged in each column of the plurality of pixels to supply an image signal to the plurality of pixels;
    a first drive electrode circuit which is arranged along the first side;
    a second drive electrode circuit which is arranged along the second side; and
    a plurality of drive electrodes which are arranged in the direction of column of the plurality of pixels and to which a drive signal to detect an object is supplied from the first drive electrode circuit and the second drive electrode circuit,
    wherein the signal lines transmit the image signal in a display period, and at least one of the signal lines transmits a control signal to control the first drive electrode circuit and the second drive electrode circuit is supplied with the control signal in a touch detection period.

5. The display device according to claim 4, further comprising:
    a touch control device which forms the control signal specifying the drive electrode from the plurality of drive electrodes in the touch detection period.

6. A display device comprising:
    a plurality of pixels arranged in a matrix form and having a first side parallel to a row and a second side opposite to the first side;
    a plurality of scanning lines arranged in each row of the plurality of pixels to supply a scanning signal to the plurality of pixels;
    a plurality of signal lines arranged in each column of the plurality of pixels to supply an image signal to the plurality of pixels;
    a first drive electrode circuit which is arranged along the first side;
    a second drive electrode circuit which is arranged along the second side; and
    a plurality of drive electrodes which are arranged in the direction of column of the plurality of pixels and to which a drive signal to detect an object is supplied from the first drive electrode circuit and the second drive electrode circuit,
    wherein the signal lines transmit the image signal in a display period, and wherein the second drive electrode circuit forms the drive signal based on a control signal in a touch detection period and the first drive electrode circuit forms the drive signal based on the control signal transmitted by at least one of the signal lines in the touch detection period.

7. The display device according to claim 6, further comprising:

a touch control device which forms the control signal specifying the drive electrode from the plurality of drive electrodes in the touch detection period.

\* \* \* \* \*